United States Patent
Yoshino

(10) Patent No.: US 8,379,900 B2
(45) Date of Patent: Feb. 19, 2013

(54) CONNECTING DEVICE, ANTENNA DEVICE, AND RECEIVING DEVICE

(75) Inventor: Yoshitaka Yoshino, Tokyo (JP)

(73) Assignee: Sony Corporation, Tokyo (JP)

( * ) Notice: Subject to any disclaimer, the term of this patent is extended or adjusted under 35 U.S.C. 154(b) by 162 days.

(21) Appl. No.: 13/050,396

(22) Filed: Mar. 17, 2011

(65) Prior Publication Data
US 2011/0235844 A1  Sep. 29, 2011

(30) Foreign Application Priority Data
Mar. 26, 2010 (JP) .................... 2010-073615

(51) Int. Cl.
*H04R 25/00* (2006.01)
*H04R 1/10* (2006.01)
*H01R 25/00* (2006.01)

(52) U.S. Cl. ............................ 381/384; 381/74; 439/638

(58) Field of Classification Search ............... 381/150, 381/370, 384, 74; 455/575.1, 569.1, 575.2; 343/702, 718, 745; 439/638, 668, 669; 379/430
See application file for complete search history.

(56) References Cited

U.S. PATENT DOCUMENTS

| | | | | |
|---|---|---|---|---|
| 6,126,465 A * | 10/2000 | Franks, Jr. | ..... | 439/218 |
| 7,553,194 B2 * | 6/2009 | Wang et al. | ..... | 439/668 |
| 7,683,974 B2 * | 3/2010 | Sun et al. | ..... | 348/705 |
| 2002/0102000 A1 * | 8/2002 | Tanaka | ..... | 381/77 |
| 2008/0207061 A1 * | 8/2008 | Mukai et al. | ..... | 439/676 |

FOREIGN PATENT DOCUMENTS

| | | |
|---|---|---|
| JP | 59-089004 | 5/1984 |
| JP | 4003671 | 8/2007 |
| JP | 4123262 | 5/2008 |

* cited by examiner

*Primary Examiner* — Tuan D Nguyen
(74) *Attorney, Agent, or Firm* — Wolf, Greenfield & Sacks, P.C.

(57) ABSTRACT

A connecting device includes an audio signal plug to which an audio signal transmission cable including at least three lines can be connected, the audio signal plug including at least three plug terminals. The three plug terminals of the audio signal plug include first, second, and third plug terminals. The first plug terminal functions as a signal line in which a high-frequency signal is superimposed on an audio signal. The second plug terminal different from the first plug terminal functions as a ground for low-frequency and high-frequency. The third plug terminal different from the first and second plug terminals functions as a ground by capacitive coupling for the high-frequency, and has a function for transmitting a signal different from a signal of the first plug terminal for the low-frequency.

20 Claims, 20 Drawing Sheets

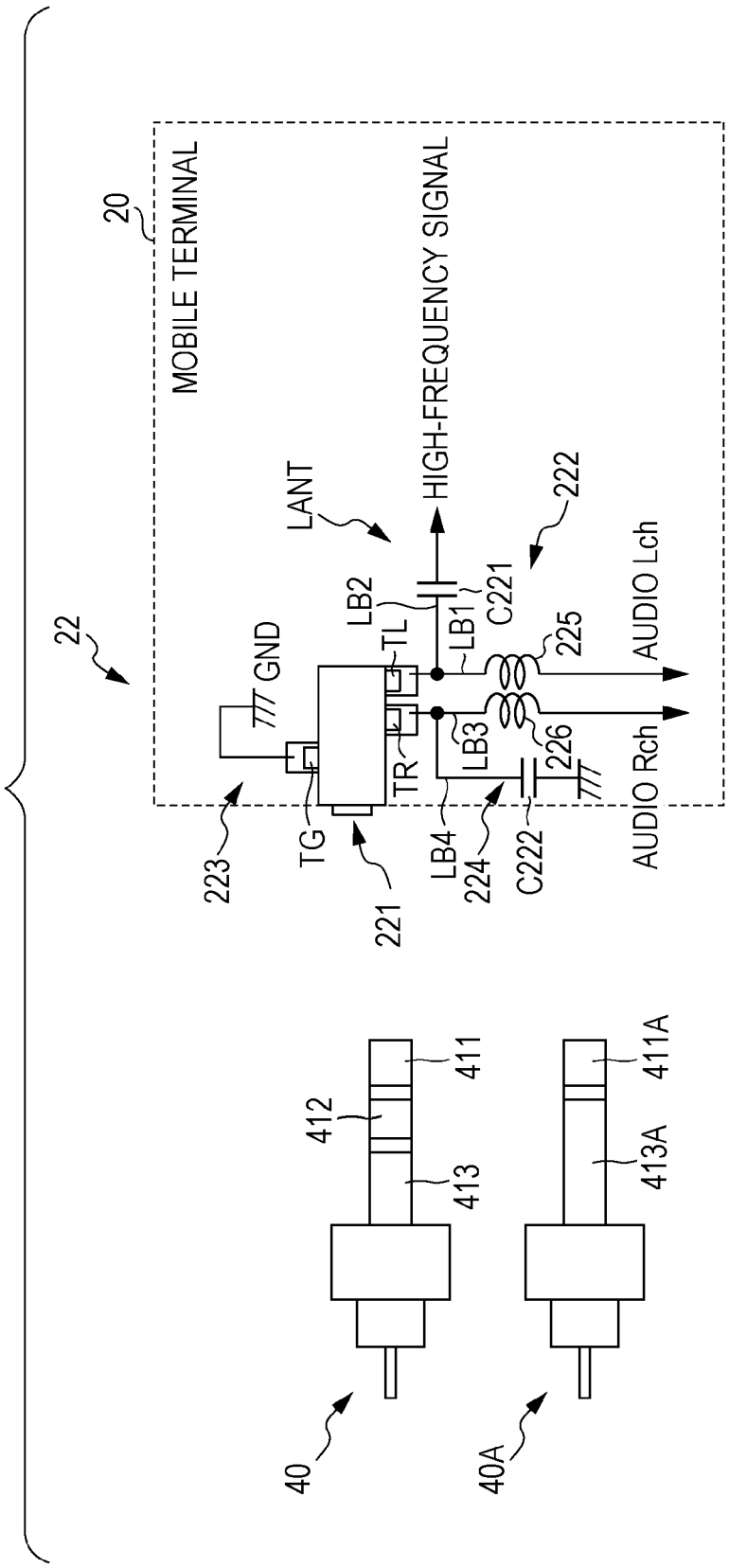

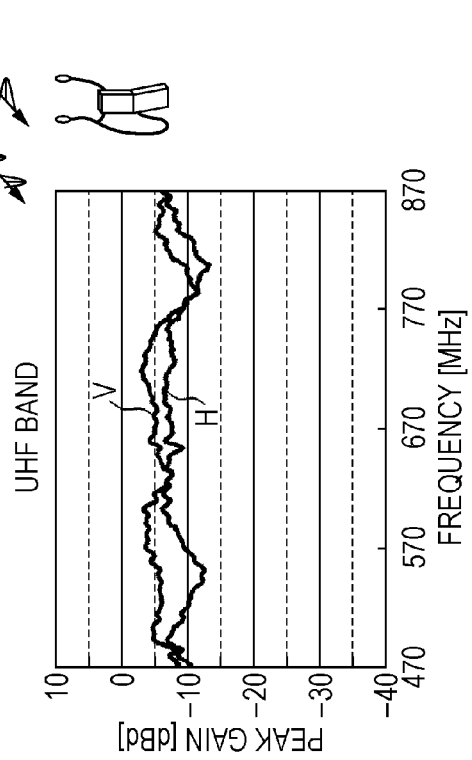
FIG. 10A
FM VHF BAND
FIG. 10B
UHF BAND
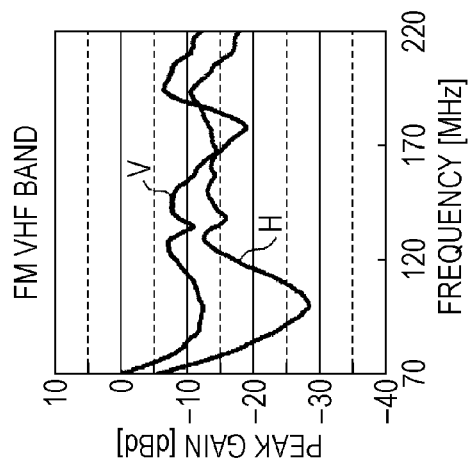
FIG. 10C
| VERTICAL POLARIZATION | | | | | | | |
|---|---|---|---|---|---|---|---|
| FREQUENCY [MHz] | 76 | 86 | 95 | 107 | 188.5 | 192.5 | 194.5 | 198.5 |
| PEAK GAIN [dBd] | −5.56 | −10.50 | −12.05 | −11.37 | −9.91 | −6.78 | −6.37 | −7.00 |
| HORIZONTAL POLARIZATION | | | | | | | |
|---|---|---|---|---|---|---|---|
| FREQUENCY [MHz] | 76 | 86 | 95 | 107 | 188.5 | 192.5 | 194.5 | 198.5 |
| PEAK GAIN [dBd] | −12.43 | −21.10 | −26.45 | −26.23 | −11.32 | −10.32 | −10.57 | −12.00 |
FIG. 10D
| VERTICAL POLARIZATION | | | | | | | |
|---|---|---|---|---|---|---|---|
| FREQUENCY [MHz] | 470 | 520 | 570 | 620 | 670 | 720 | 770 | 906 |
| PEAK GAIN [dBd] | −8.60 | −6.00 | −3.75 | −6.14 | −4.92 | −2.98 | −8.45 | 0.77 |
| HORIZONTAL POLARIZATION | | | | | | | |
|---|---|---|---|---|---|---|---|
| FREQUENCY [MHz] | 470 | 520 | 570 | 620 | 670 | 720 | 770 | 906 |
| PEAK GAIN [dBd] | −10.87 | −9.91 | −9.55 | −6.94 | −7.56 | −7.18 | −9.05 | −0.97 |

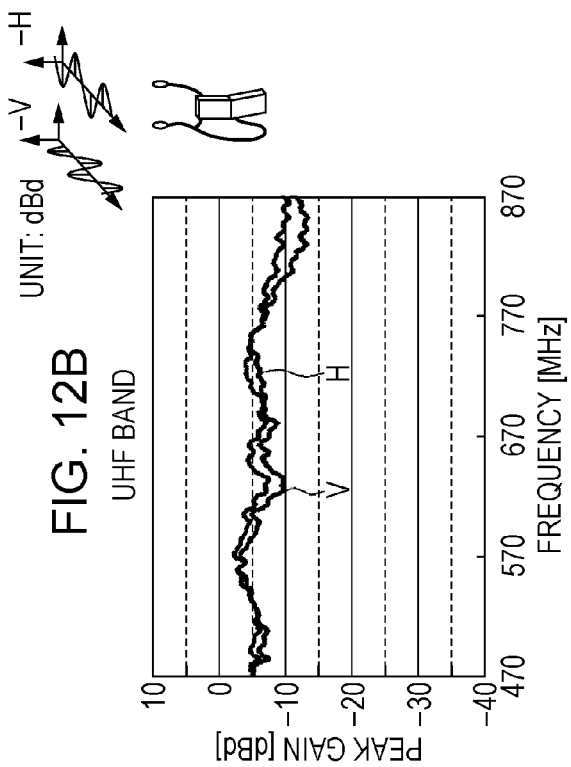
FIG. 12A
FM VHF BAND
FIG. 12B
UHF BAND
FIG. 12C
| | | | | | | | |
|---|---|---|---|---|---|---|---|
| VERTICAL POLARIZATION | | | | | | | |
| FREQUENCY [MHz] | 76 | 86 | 95 | 107 | 188.5 | 192.5 | 194.5 | 198.5 |
| PEAK GAIN [dBd] | −7.28 | −11.10 | −14.05 | −15.24 | −18.91 | −13.09 | −11.08 | −7.38 |
| HORIZONTAL POLARIZATION | | | | | | | |
| FREQUENCY [MHz] | 76 | 86 | 95 | 107 | 188.5 | 192.5 | 194.5 | 198.5 |
| PEAK GAIN [dBd] | −12.12 | −17.10 | −20.45 | −20.90 | −13.67 | −12.72 | −12.61 | −11.50 |
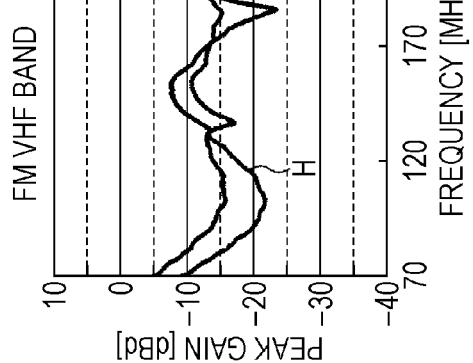
FIG. 12D
| | | | | | | | |
|---|---|---|---|---|---|---|---|
| VERTICAL POLARIZATION | | | | | | | |
| FREQUENCY [MHz] | 470 | 520 | 570 | 620 | 670 | 720 | 770 | 906 |
| PEAK GAIN [dBd] | −5.20 | −5.89 | −3.24 | −8.01 | −7.52 | −4.15 | −6.85 | −6.43 |
| HORIZONTAL POLARIZATION | | | | | | | |
| FREQUENCY [MHz] | 470 | 520 | 570 | 620 | 670 | 720 | 770 | 906 |
| PEAK GAIN [dBd] | −5.40 | −6.00 | −2.35 | −5.81 | −6.07 | −5.95 | −6.65 | −7.63 |

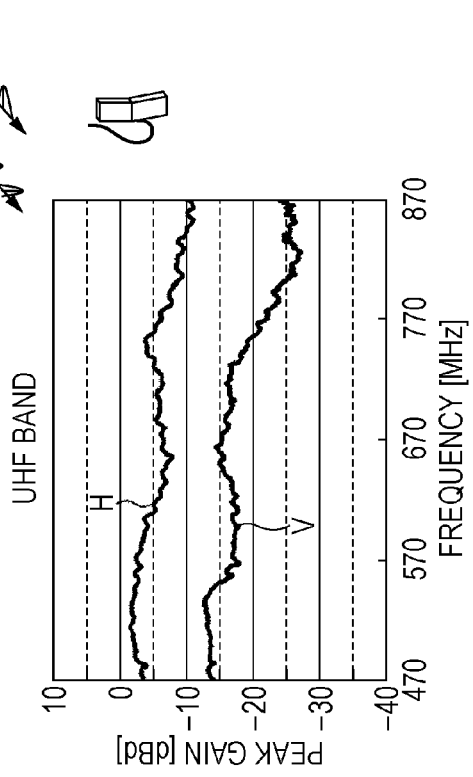
FIG. 13A
FM VHF BAND
FIG. 13B
UHF BAND
| VERTICAL POLARIZATION | | | | | | | |
|---|---|---|---|---|---|---|---|
| FREQUENCY [MHz] | 76 | 86 | 95 | 107 | 188.5 | 192.5 | 194.5 | 198.5 |
| PEAK GAIN [dBd] | −34.52 | −35.90 | −36.25 | −35.37 | −27.56 | −27.25 | −27.44 | −27.60 |
| HORIZONTAL POLARIZATION | | | | | | | |
|---|---|---|---|---|---|---|---|
| FREQUENCY [MHz] | 76 | 86 | 95 | 107 | 188.5 | 192.5 | 194.5 | 198.5 |
| PEAK GAIN [dBd] | −34.24 | −34.90 | −34.05 | −33.17 | −23.17 | −22.69 | −22.89 | −22.60 |
FIG. 13C
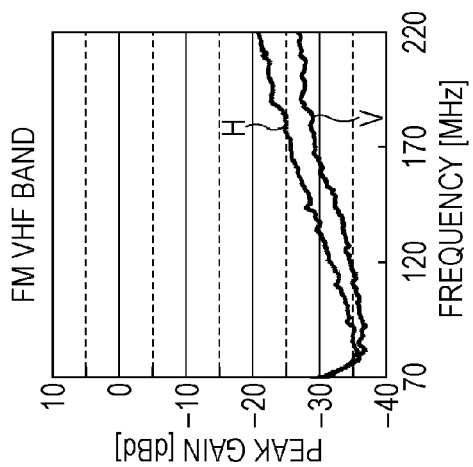
| VERTICAL POLARIZATION | | | | | | | |
|---|---|---|---|---|---|---|---|
| FREQUENCY [MHz] | 470 | 520 | 570 | 620 | 670 | 720 | 770 | 906 |
| PEAK GAIN [dBd] | −14.13 | −13.29 | −17.55 | −17.14 | −15.36 | −16.40 | −22.05 | −19.37 |
| HORIZONTAL POLARIZATION | | | | | | | |
|---|---|---|---|---|---|---|---|
| FREQUENCY [MHz] | 470 | 520 | 570 | 620 | 670 | 720 | 770 | 906 |
| PEAK GAIN [dBd] | −3.60 | −2.00 | −2.55 | −5.54 | −6.72 | −6.35 | −6.25 | −9.63 |
FIG. 13D

| | VERTICAL POLARIZATION | | | | | | |
|---|---|---|---|---|---|---|---|
| FREQUENCY [MHz] | 470 | 520 | 570 | 620 | 670 | 720 | 770 | 906 |
| PEAK GAIN [dBd] | -7.33 | -11.40 | -9.64 | -11.08 | -4.67 | -3.55 | -6.05 | -6.63 |

| | HORIZONTAL POLARIZATION | | | | | | |
|---|---|---|---|---|---|---|---|
| FREQUENCY [MHz] | 470 | 520 | 570 | 620 | 670 | 720 | 770 | 906 |
| PEAK GAIN [dBd] | -5.60 | -12.11 | -11.24 | -8.34 | -4.56 | -4.95 | -6.65 | -3.98 |

| | VERTICAL POLARIZATION | | | | | | |
|---|---|---|---|---|---|---|---|
| FREQUENCY [MHz] | 470 | 520 | 570 | 620 | 670 | 720 | 770 | 906 |
| PEAK GAIN [dBd] | -6.53 | -7.60 | -3.24 | -10.14 | -5.32 | -5.15 | -6.85 | -7.98 |

| | HORIZONTAL POLARIZATION | | | | | | |
|---|---|---|---|---|---|---|---|
| FREQUENCY [MHz] | 470 | 520 | 570 | 620 | 670 | 720 | 770 | 906 |
| PEAK GAIN [dBd] | -4.80 | -8.02 | -5.35 | -6.54 | -5.72 | -6.18 | -8.25 | -5.58 |

CONNECTING DEVICE, ANTENNA DEVICE, AND RECEIVING DEVICE

BACKGROUND OF THE INVENTION

1. Field of the Invention

The present invention relates to a connecting device that can be applied to a mobile electronic device, such as a mobile audio visual device or a cellular phone, and also relates to an antenna device and a receiving device of the connecting device.

2. Description of the Related Art

Since a mobile electronic device obtains a large screen and high performance, and since a television (TV) tuner becomes small and thin, a mobile electronic device terminal that user can watch and listen to television is being widely spread.

Also, in recent years, an electronic device such as a communication terminal, for example, a cellular phone frequently has a function for receiving broadcast waves of FM radio, digital radio, or digital television.

A user may listen to the sound of the electronic device with an earphone (including headphone) through an earphone cable that uses a coaxial cable.

Also, when an electronic device such as a cellular phone includes a television receiver, a user listens to the sound with an earphone while a cable for the earphone is formed as a shielded cable and hence functions as a receiving antenna, so that the cable is also used for transmission of a high-frequency signal.

For example, Japanese Patent No. 4003671 and Japanese Patent No. 4123262 disclose such earphone antennas.

SUMMARY OF THE INVENTION

The earphone antenna frequently uses an earphone cable with a plug of ϕ3.5 mm or ϕ2.5 mm and serves as an antenna for receiving FM broadcast waves and terrestrial digital broadcasting service called One Seg.

However, when a cylindrical terminal of a ϕ3.5-mm or ϕ2.5-mm pole is used, high-frequency coupling markedly increases and deterioration in antenna gain becomes noticeable.

It is desirable to provide a connecting device, an antenna device, and a receiving device that can reduce a loss at a terminal coupling portion and provide high receiving performance.

A connecting device according to an embodiment of the present invention includes an audio signal plug to which an audio signal transmission cable including at least three lines can be connected, the audio signal plug including at least three plug terminals. The three plug terminals of the audio signal plug include first, second, and third plug terminals. The first plug terminal functions as a signal line in which a high-frequency signal is superimposed on an audio signal. The second plug terminal different from the first plug terminal functions as a ground for low-frequency and high-frequency. The third plug terminal different from the first and second plug terminals functions as a ground by capacitive coupling for the high-frequency, and has a function for transmitting a signal different from a signal of the first plug terminal for the low-frequency.

An antenna device according to another embodiment of the present invention includes a connecting device including an audio signal plug having at least three plug terminals including first, second, and third plug terminals; and an audio signal transmission cable including at least three lines including a first line, the audio signal transmission cable transmitting an audio signal when the audio signal plug is connected to one end side of the audio signal transmission cable. The first plug terminal of the audio signal plug and the first line of the audio signal transmission cable are connected to each other, and hence an antenna signal line in which a high-frequency signal is superimposed on an audio signal is formed at the first plug terminal. The second plug terminal different from the first plug terminal functions as a ground for high-frequency and low-frequency. The third plug terminal different from the first and second plug terminals functions as a ground by capacitive coupling for the high-frequency, and has a function for transmitting a signal different from a signal of the first plug terminal for the low-frequency.

A receiving device according to still another embodiment of the present invention includes an antenna device; and an electronic device to which the antenna device can be connected, the electronic device having a receiving function for a broadcast wave. The antenna device includes a connecting device including an audio signal plug having at least three plug terminals including first, second, and third plug terminals, and an audio signal transmission cable including at least three lines including a first line, the audio signal transmission cable transmitting an audio signal when the audio signal plug is connected to one end side of the audio signal transmission cable. The first plug terminal of the audio signal plug and the first line of the audio signal transmission cable are connected to each other, and hence an antenna signal line in which a high-frequency signal is superimposed on an audio signal is formed at the first plug terminal. The second plug terminal different from the first plug terminal functions as a ground for high-frequency and low-frequency. The third plug terminal different from the first and second plug terminals functions as a ground by capacitive coupling for the high-frequency, and has a function for transmitting a signal different from a signal of the first plug terminal for the low-frequency.

With the configuration, the loss at the terminal coupling portion can be reduced and the high receiving performance can be provided.

BRIEF DESCRIPTION OF THE DRAWINGS

FIG. 7 is an illustration showing an equivalent circuit of a connecting device for a mobile terminal (electronic device) including a 3-pole jack portion according to the first embodiment;

FIGS. 10A to 10D are illustrations showing peak gain characteristics for frequencies of the receiving device according to the first embodiment in a VHF band and an UHF band when an earphone cable is connected to the antenna cable;

FIGS. 12A to 12D are illustrations showing peak gain characteristics for frequencies of a receiving device according to the second embodiment in a VHF band and an UHF band when an earphone cable is connected to an antenna cable;

FIGS. 13A to 13D are illustrations showing peak gain characteristics for frequencies of the receiving device, as a comparative example, in the VHF band and the UHF band when the earphone cable is not connected to the antenna cable;

DESCRIPTION OF THE PREFERRED EMBODIMENTS

Embodiments of the present invention will be described below with reference to the drawings.

Description is given in the following order.
1. First embodiment (first configuration example of receiving system (receiving device))
2. Second embodiment (second configuration example of receiving system (receiving device))
3. Third embodiment (third configuration example of receiving system (receiving device))
4. Fourth embodiment (fourth configuration example of receiving system (receiving device))
5. Fifth embodiment (fifth configuration example of receiving system (receiving device))
6. Sixth embodiment (sixth configuration example of receiving system (receiving device))
7. Seventh embodiment (seventh configuration example of receiving system (receiving device))

1. First Embodiment

First Configuration Example of Receiving System (Receiving Device)

Figure 1:
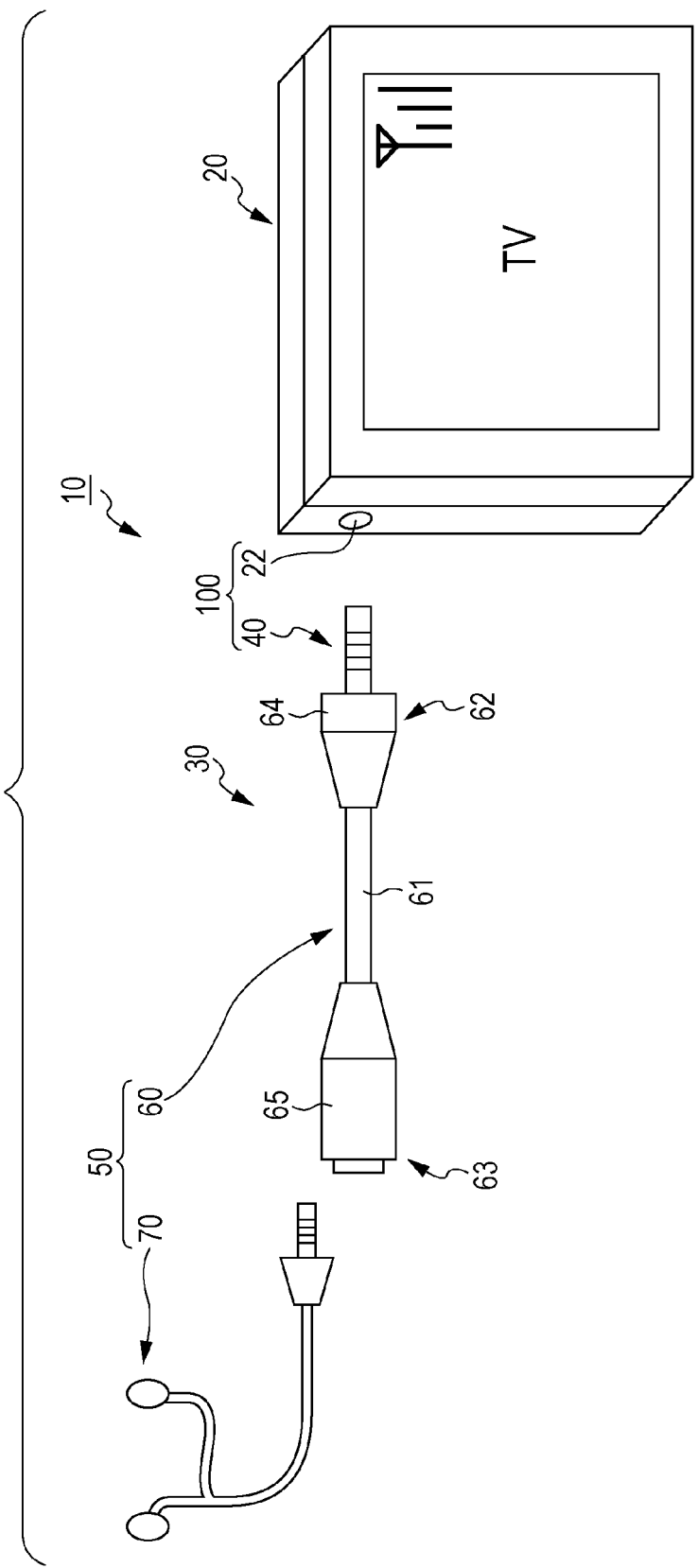
FIG. 1 is an illustration showing a receiving system (receiving device) including a mobile terminal, which is an example of an electronic device (set device) including an antenna cable that forms an antenna device according to a first embodiment of the present invention.

FIG. 1 is an illustration showing a receiving system (receiving device) including a mobile terminal, which is an example of an electronic device (set device) including an antenna cable that forms an antenna device according to a first embodiment of the present invention.

Figure 2:
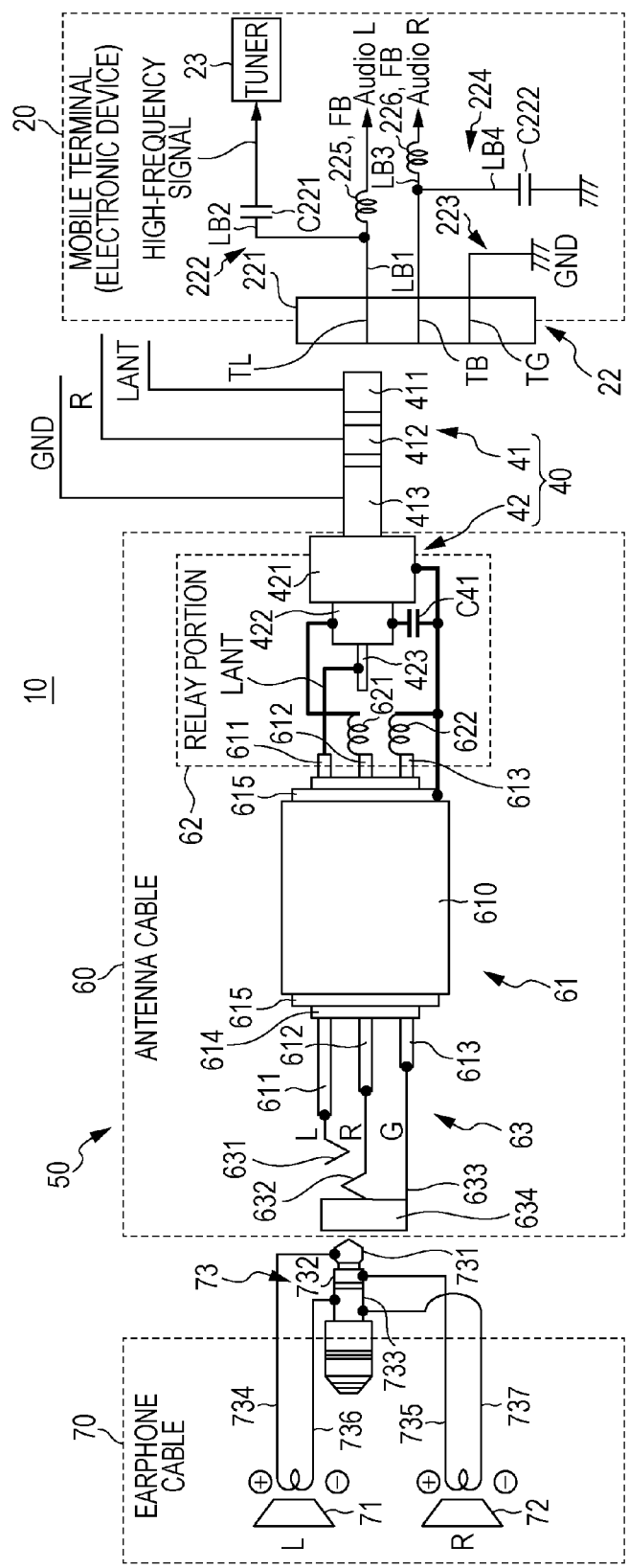
FIG. 2 is an illustration showing an equivalent circuit of the receiving system according to the first embodiment of the present invention.

FIG. 2 is an illustration showing an equivalent circuit of the receiving system according to the first embodiment of the present invention.

Figure 3:
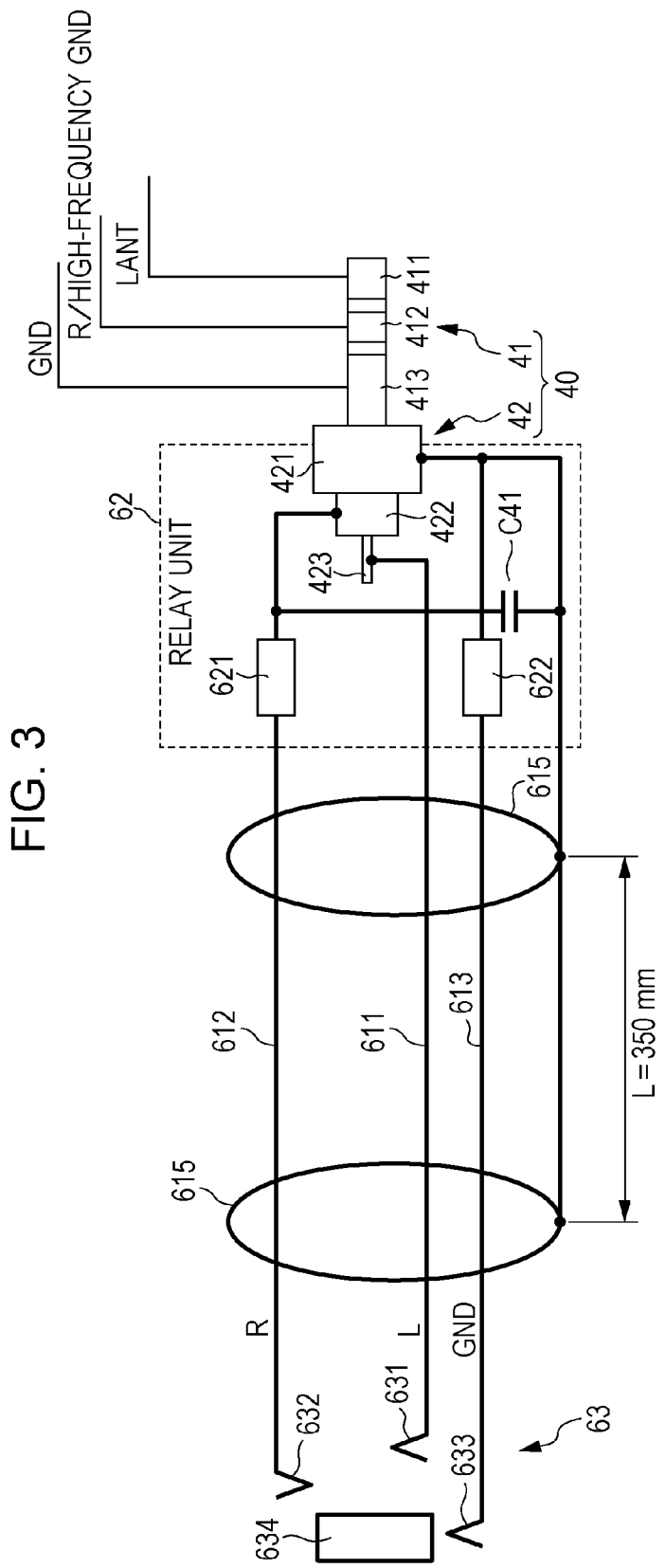
FIG. 3 is an illustration showing an equivalent circuit of a plug connecting portion including a shielded coaxial cable and a relay board, the plug connecting portion forming the antenna cable according to this embodiment.

FIG. 3 is an illustration showing an equivalent circuit of a plug connecting portion including a shielded coaxial cable and a relay board, the plug connecting portion forming the antenna cable according to this embodiment.

A receiving system 10 includes a mobile terminal 20 serving as an electronic device, and an antenna device 30 as main components.

The mobile terminal 20 includes, for example, a television receiver, and includes an audio system circuit, a display system circuit, a display unit 21 such as a liquid crystal display device, and an operation unit for key entry or the like.

The mobile terminal 20 includes a round type jack portion 22 or the like, to which a 3-pole plug 40 that forms the antenna device 30 is connected, for reception of a high-frequency signal.

Either or both the 3-pole plug 40 and the round type jack portion 22 form a connecting device 100.

The configuration of the connecting device for the mobile terminal (electronic device) including the round type jack portion 22 will be described later in detail.

The antenna device 30 of this embodiment can receive radio signals in an FM band transmitted from, for example, a broadcast station, and in a range from a VHF band to an UHF band that are used for receiving digital television broadcast, and can transmit the ratio signals.

The antenna device 30 mainly includes the audio signal 3-pole plug 40 and an audio signal transmission cable 50. The connecting device including the jack portion 22 is formed at the mobile terminal 20 serving as an electronic device.

In the first embodiment, the audio signal transmission cable 50 includes an antenna cable 60 and an earphone cable 70.

The antenna device 30 of the first embodiment is formed as an earphone-separate-type sleeve antenna.

The antenna cable 60 includes the 3-pole plug 40 of φ3.5 mm or φ2.5 mm that is connected to one end portion of a shielded coaxial cable 61 through a relay portion 62, and a 3-pole jack 63 of φ3.5 mm or φ2.5 mm that is connected to the other end portion of the shielded coaxial cable 61.

Caps 64 and 65 are arranged respectively at a connecting portion by a relay board of the 3-pole plug 40 and a formation portion of the 3-pole jack 63.

In this embodiment, the length of the coaxial cable 61 is 350 mm, and the length of the earphone cable 70 is 1200 mm.

Configuration Example of 3-Pole Plug

The 3-pole plug 40 includes a left-channel (Lch) terminal 411 and a right-channel (Rch) terminal 412 for stereo audio signals, and a ground (GND) terminal 413 that are formed at a cylindrical tip end portion 41, which is inserted into the jack portion 22, and that are insulated from one another.

The 3-pole plug 40 includes a GND terminal 421, an Rch terminal 422, and an Lch terminal 423 that are formed at a cylindrical rear end portion 42, which is connected to one end portion (side) of the antenna cable 60, and that are insulated from one another.

In the 3-pole plug 40, the Lch terminal 411 at the tip end portion 41 is electrically connected with the Lch terminal 423 at the rear end portion 42 through a cylindrical shaft.

The Rch terminal 412 at the tip end portion 41 is electrically connected with the Rch terminal 422 at the rear end portion 42 through a cylindrical shaft.

The GND terminal 413 at the tip end portion 41 is electrically connected with the GND terminal 421 at the rear end portion 42 through a cylindrical shaft.

In this embodiment, the Lch terminal 423 is formed at a center portion of the cylinder, the Rch terminal 422 is formed at an outer peripheral portion of (outside) the center portion, and the GND terminal 421 is formed at a further outer peripheral portion of (outside) the outer peripheral portion.

In the 3-pole plug 40, the Lch terminal 411 at the tip end portion 41 and the Lch terminal 423 at the rear end portion 42 form a first plug terminal.

The GND terminal 413 at the tip end portion 41 and the GND terminal 421 at the rear end portion 42 form a second plug terminal.

The Rch terminal 412 at the tip end portion 41 and the Rch terminal 422 at the rear end portion 42 form a third plug terminal.

In this embodiment, a high-frequency signal and a low-frequency audio signal L are superimposed on each other at the Lch terminals 411 and 423 serving as the first plug terminal.

The GND terminals 413 and 421 serving as the second plug terminal function as grounds for high-frequency and low-frequency.

The Rch terminals 412 and 422 serving as the third plug terminal function as grounds by capacitive coupling for high-frequency, and have a function for transmitting an audio signal R that is different from the audio signal of the Lch terminals 411 and 423 serving as the first plug terminal, for low-frequency.

In the 3-pole plug 40, a capacitor C41 is formed between the GND terminal 421 serving as the second plug terminal and the Rch terminal 422 serving as the third plug terminal. The capacitor C41 enhances the ground for high-frequency.

Figure 4:
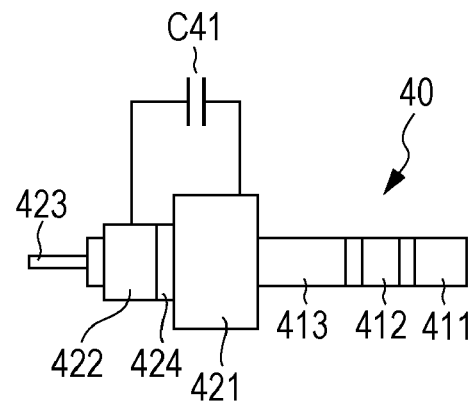
FIG. 4 is an illustration for explaining a capacitor formed between a GND terminal serving as a second plug terminal, and an Rch terminal serving as a third plug terminal.

FIG. 4 is an illustration for explaining the capacitor formed between the GND terminal 421 serving as the second plug terminal and the Rch terminal 422 serving as the third plug terminal.

Referring to FIG. 4, for example, when the 3-pole plug 40 of φ3.5 is explained, a tip of a round type plug portion is typically located at the center of the plug, and GND for high-frequency is provided around the center, a high-frequency loss (loss) is reduced.

Also, an insulating portion between the GND terminal 421 and the Rch terminal 422 may be formed of, for example, insulating resin 424. The insulating resin 424 may function as a capacitor and adjust an impedance.

Accordingly, when a multi-core earphone antenna, in particular, a multi-core coaxial-line earphone antenna is used like this embodiment, if the insulating portion is fabricated with regard to a dielectric constant of the insulating resin 424 for insulation of the portion, the insulating portion can have the same structure as the GND for high-frequency, and hence a loss at the plug portion can be reduced.

In this embodiment, with the above reason, the Lch terminals 423 and 411 formed at the center of the plug and the most tip end portion of the plug serve as the first plug terminal and serve as an antenna signal line LANT.

Alternatively, an Rch terminal may function as a first plug terminal and an Lch terminal may function as a third plug terminal.

The antenna cable 60 includes the coaxial cable 61, the relay portion 62 arranged at one end portion of the coaxial cable 61, and the 3-pole jack 63 formed at the other end portion of the coaxial cable 61.

The relay portion 62 is covered with the cap 64, and the 3-pole jack 63 is covered with the cap 65.

The coaxial cable 61 includes a plurality of lines. The 3-pole plug 40 is connected to one end side of the coaxial cable 61 at the relay portion 62. The earphone cable 70 can be connected to the other end side of the coaxial cable 61 through the 3-pole jack 63.

The coaxial cable 61 is formed of a shielded coaxial cable that is covered with, for example, a jacket.

Configuration Example of Antenna Cable (Configuration Example of Shielded Coaxial Cable)

Figure 5:
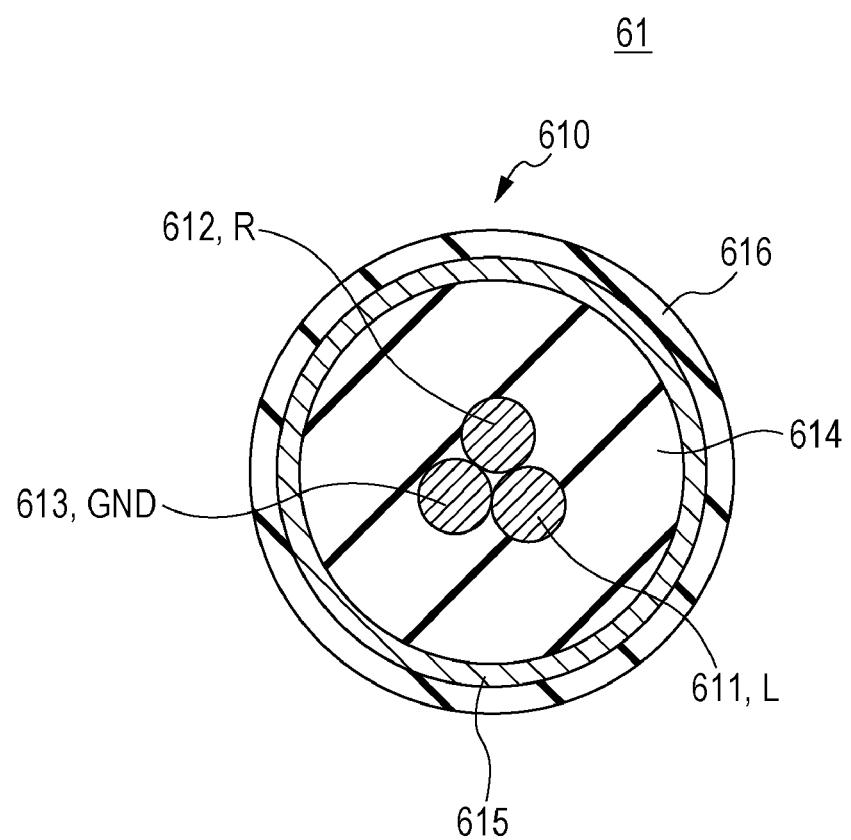
FIG. 5 is an illustration showing a structure example of the shielded coaxial cable.

FIG. 5 is an illustration showing a structure example of the shielded coaxial cable.

The shielded coaxial cable 61 in FIG. 5 is formed of a 3-core coaxial cable 610.

The 3-core coaxial cable 610 includes a plurality of core wires 611, 612, and 613 for respectively forming an L line and an R line for audio, and a GND line; and an inner insulator 614 for insulating the core wires 611, 612, and 613.

The coaxial cable 610 also includes a shield portion 615 serving as an outer conductor arranged on the outer periphery of the insulator 614, and an outer insulator (outer cover, jacket) 616, such as an elastomer, that covers the entire outer periphery.

The core wire 611 that forms the L line corresponds to a first line, the core wire 613 that forms the GND line corresponds to a second line, and the core wire 612 that forms the R line corresponds to a third line.

The core wires 611, 612, and 613 are formed of, for example, polyurethane wires containing aramid fiber.

The insulator 614 is formed by, for example, X-ray irradiation crosslink PE.

The shield portion 615 is formed of, for example, an annealed copper wire.

The shield portion 615 is also formed of a plurality of conductive wires, for example, a braided shield provided by braiding bare annealed copper wires.

The braided shield is used for an electrostatic shielding method having proper flexibility, bending strength, and mechanical strength while a gap is less likely generated for the shield when the shield bends.

The core wires 611, 612, and 613, and the shield portion 615 have impedances for high-frequency.

Configuration Example of Relay Portion

Next, a configuration example of the relay portion 62 will be described.

FIGS. 2 and 3 illustrate a specific configuration of the relay portion according to this embodiment, and a connection example between the coaxial transmission cable and the coaxial cable.

The relay portion 62 is formed of, for example a substrate, or is formed by molding.

At the one end portion side of the relay portion 62, the insulator 614, the shield portion 615, and the jacket 616 of the coaxial cable 610 are removed and hence the core wires 611, 612, and 613 are exposed.

Also, at a position near the relay portion 62, the jacket 616 is removed and hence the shield portion 615 is exposed.

At the other end side of the relay portion 62, the rear end portion 42 of the 3-pole plug 40 is arranged to face end portions of the core wires 611, 612, and 613 at the one end side of the coaxial cable 610.

In the relay portion 62, the core wire 611 (Lch line) of the coaxial cable 610 is directly connected to the Lch terminal 423 at the rear end portion 42 of the 3-pole plug 40.

In the relay portion 62, a high-frequency cutoff portion 621 is connected to the Rch terminal 422 at the rear end portion 42 of the 3-pole plug 40. For example, the high-frequency cutoff portion 621 is formed of an inductor L1 or a ferrite bead FB1 having a high-frequency cutoff function.

The Rch terminal 422 at the rear end portion 42 of the 3-pole plug 40 is connected to the core wire 612 (Rch line) of the coaxial cable 610 through the high-frequency cutoff portion 621.

In the relay portion 62, a high-frequency cutoff portion 622 is connected to the GND terminal 421 at the rear end portion 42 of the 3-pole plug 40. For example, the high-frequency cutoff portion 622 is formed of an inductor L2 or a ferrite bead FB2 having a high-frequency cutoff function.

The GND terminal 421 at the rear end portion 42 of the 3-pole plug 40 is connected to the core wire 613 (GND line) of the coaxial cable 610 through the high-frequency cutoff portion 622. The connecting portion is connected to the shield portion 615 of the coaxial cable 610.

In the relay portion 62, the capacitor C41 is formed between the Rch terminal 422 serving as the third plug terminal and the connecting portion of the GND terminal 421 serving as the second plug terminal, the high-frequency cutoff portion 622, and the shield portion 615.

The high-frequency cutoff portions 621 and 622 are mounted for high-frequency cutoff such that a low impedance is obtained in a sound band and a high impedance is obtained in a high-frequency region, for example, in the VHF band or higher at the audio line and GND line of Rch.

Figure 6:
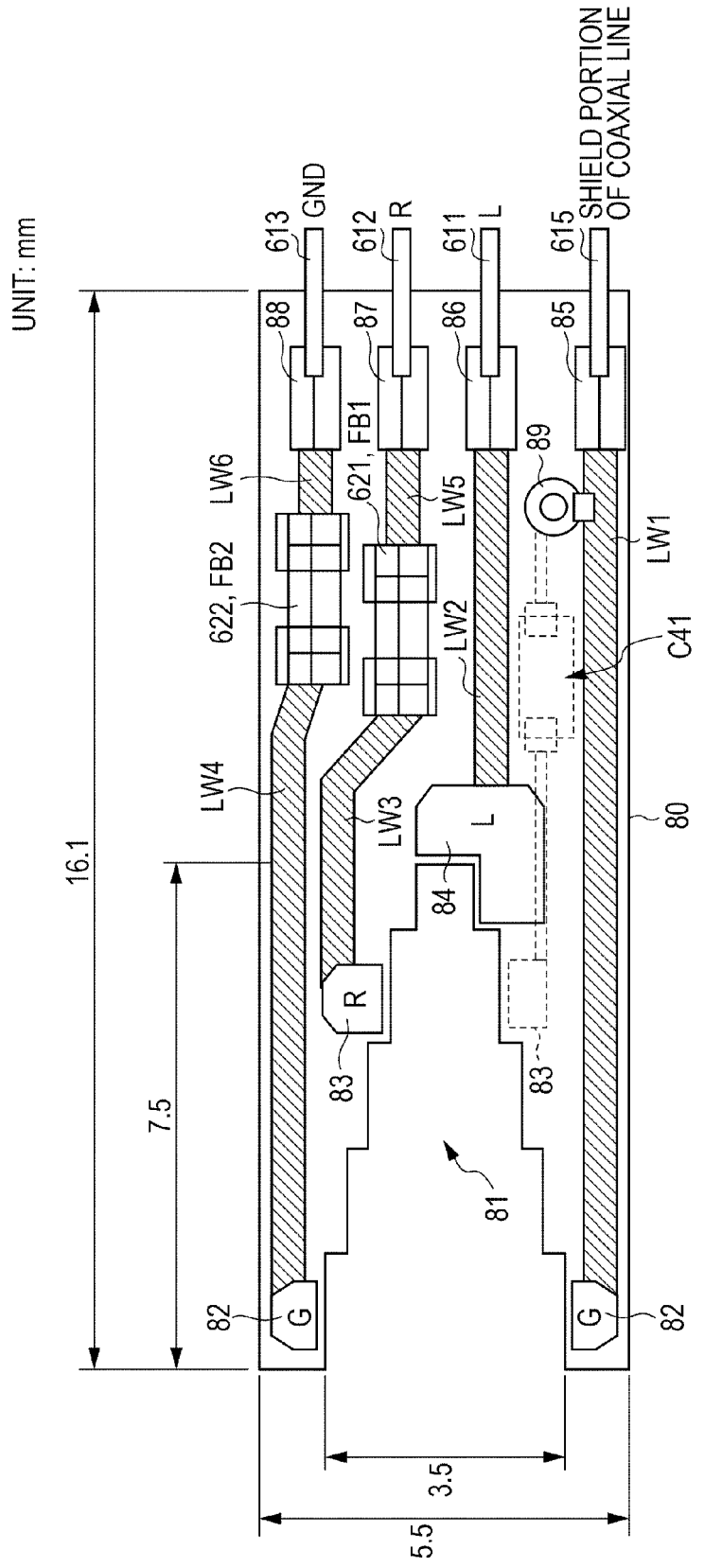
FIG. 6 is an illustration showing a configuration example of a mounting board in a relay portion according to this embodiment.

FIG. 6 is an illustration showing a configuration example of a mounting board in the relay portion according to this embodiment.

A mounting board 80 has a rectangular shape with a length of 16.1 mm and a width of 5.5 mm.

The mounting board 80 includes a plug housing region 81 at an one end portion in the longitudinal direction of the mounting board 80. The plug housing region 81 houses the rear end portion 42 of the 3-pole plug 40 of, for example, φ3.5 mm.

In this embodiment, the rear end portion 42 of the 3-pole plug 40 has a length of about 7.5 mm.

A GND terminal 82 is formed around the plug housing region 81. The GND terminal 82 is connected to the GND terminal 421 of the 3-pole plug 40, the GND terminal 421 which is housed at a position near a housing port of the plug housing region 81.

An R terminal 83 is formed at an intermediate portion near a tip end in the longitudinal direction of the plug housing region 81. The R terminal 83 is connected to the Rch terminal 422.

An L terminal 84 is formed at a tip end portion in the longitudinal direction of the plug housing region 81. The L terminal 84 is connected to the Lch terminal 423.

The mounting board 80 includes connecting terminals 85, 86, 87, and 88 at the other end portion in the longitudinal direction of the mounting board 80. The shield portion 615, and the core wires 611, 612, and 613 of the coaxial cable 610 are respectively connected to the connecting terminals 85, 86, 87, and 88 by soldering or the like.

The connecting terminal 85, to which the shield portion 615 is connected, is connected to the GND terminal 82 through a connecting wire LW1.

A connecting terminal 89 is connected to the connecting wire LW1. The capacitor C41 is formed between the connecting terminal 89 and the R terminal 83 serving as the Rch terminal.

The connecting terminal 86, to which the core wire 611 serving as the Lch line, is connected to the L terminal 84 through a connecting wire LW2.

The ferrite bead FB1, which forms the high-frequency cutoff portion 621, is mounted between the arrangement positions of the R terminal 83 and the connecting terminal 87.

The ferrite bead FB2, which forms the high-frequency cutoff portion 622, is mounted between the arrangement positions of the GND terminal 82 and the connecting terminal 88.

The R terminal 83 is connected to the ferrite bead FB1 through a connecting wire LW3. The GND terminal 82 is connected to the ferrite bead FB2 through a connecting wire LW4.

The ferrite bead FB1 is connected to the connecting terminal 87 through a connecting wire LW5. The ferrite bead FB2 is connected to the connecting terminal 88 through a connecting wire LW6.

The mounting board 80 has a structure serving as an antenna such that the terminals 421, 422, and 423 at the rear end portion 42 of the 3-pole plug 40 are respectively connected to the terminals 82, 83, and 84, which respectively correspond to the plug terminals, by soldering.

Configuration Example of 3-pole Jack of Antenna Cable

Referring to FIGS. 2 and 3, the 3-pole jack 63 includes an Lch terminal 631, an Rch terminal 632, and a GND terminal 633.

At the other end portion of the coaxial cable 610 near the 3-pole jack 63, the insulator 614, the shield portion 615, and the jacket 616 are removed and hence the core wires 611, 612, and 613 are exposed. Also, at the position near the 3-pole jack 63, the jacket 616 is removed and hence the shield portion 615 is exposed.

The Lch terminal 631 is connected to the core wire 611, the Rch terminal 632 is connected to the core wire 612, and the GND terminal 633 is connected to the core wire 613.

Also, in the drawing, reference sign 634 denotes a plug insertion port.

Configuration Example of Earphone Cable

One end portion of the earphone cable 70 is split and an Lch earphone 71 and an Rch earphone 72 are connected to the one end portion. A 3-pole plug 73 of φ3.5 mm or φ2.5 mm is connected to the other end portion.

A cylindrical tip end portion of the 3-pole plug 73 can be inserted into and connected to the 3-pole jack 63 of the antenna cable 60. The 3-pole plug 73 includes an Lch terminal 731, an Rch terminal 732, and a GND terminal 733.

The Lch terminal 731 is connected to the earphone 71 through an Lch line 734, the Rch terminal 732 is connected to the earphone 72 through an Rch line 735, and the GND terminal 733 is connected to GND lines 736 and 737.

Configuration Example of Connecting Device for Mobile Terminal (Electronic Device) Including 3-pole Jack Portion 22

FIG. 7 is an illustration showing an equivalent circuit of a connecting device for the mobile terminal (electronic device) including the 3-pole jack portion 22 according to the first embodiment.

FIG. 7 also illustrates the 3-pole plug 40 and a 2-pole plug 40A that can be connected to the jack portion 22.

Referring to FIGS. 2 and 7, the 3-pole jack portion 22 formed at the mobile terminal 20 includes a 3-pole jack 221, and lead portions (lead line portions) 222, 223, and 224.

The 3-pole jack 221 includes an Lch terminal TL serving as a first jack terminal, a GND terminal TG serving as a second jack terminal, and an Rch terminal TR serving as a third jack terminal.

When the 3-pole plug 40 is inserted into and connected to the 3-pole jack 221, the terminals of the 3-pole jack 221 are arranged such that the Lch terminal 411 at the tip end portion is connected to the Lch terminal TL, the Rch terminal 412 is connected to the Rch terminal TR, and the GND terminal 413 is connected to the GND terminal TG.

The first lead portion 222 is connected to the Lch terminal TL serving as the first jack terminal, the second lead portion 223 is connected to the GND terminal TG serving as the second jack terminal, and the third lead portion 224 is connected to the Rch terminal TR serving as the third jack terminal.

The first lead portion 222 connected to the Lch terminal TL serving as the first jack terminal is split into two lines including a first split line LB1 and a second split line LB2. A high-frequency cutoff portion 225 for high-frequency cutoff is inserted (connected) to the first split line LB1. The high-frequency cutoff portion 225 is formed of an inductor L or a ferrite bead FB.

The first lead portion 222 supplies an Lch audio signal to a signal processing system (not shown) through the high-frequency cutoff portion 225 of the first split line LB1.

The second split line LB2 of the first lead portion 222 forms an antenna signal line LANT, is connected to a capacitor C221 for acquiring a high-frequency signal, and is connected to a tuner 23 through the capacitor C221.

The second lead portion 223 connected to the GND terminal TG serving as the second jack terminal is directly connected to the ground (set ground) GND of the device.

The third lead portion 224 connected to the Rch terminal TR serving as the third jack terminal is split into two lines including a first split line LB3 and a second split line LB4. A high-frequency cutoff portion 226 for high-frequency cutoff is inserted (connected) to the first split line LB3. The high-frequency cutoff portion 226 is formed of an inductor L or a ferrite bead FB.

The third lead portion 224 supplies an Rch audio signal to a signal processing system (not shown) through the high-frequency cutoff portion 226 of the first split line LB3.

The second split line LB4 of the third lead portion 224 is connected to the ground for high-frequency, and has (is connected to) a capacitor C222 for separation for low-frequency.

It is to be noted that the 3-pole jack portion 22 having this configuration can be applied to the 2-pole plug 40A.

A superimposed signal in which a high-frequency signal and a low-frequency signal are superimposed on each other propagates to a terminal 411A at a tip end portion of the 2-pole plug 40A. The terminal 411A is connected to the Lch terminal LT serving as the first jack terminal of the jack portion 22.

A rear end portion of the 2-pole plug 40A with respect to the terminal 411A is formed as a GND terminal 413A. The GND terminal 413A is connected to the GND terminal TG serving as the second jack terminal and to the Rch terminal TR serving as the third jack terminal of the jack portion 22.

As described above, at the 3-pole jack portion 22 of the connecting device according to this embodiment, the Lch (left channel) terminal LT for a stereo audio signal is arranged at the tip end side, and the Rch (right channel) terminal LR for a stereo audio signal is arranged at an intermediate portion in the longitudinal direction of the jack.

The capacitor C222 that is connected to the ground for high-frequency, and provides separation for low-frequency is formed at (connected to) the Rch terminal LR.

The capacitor C222 makes a contribution to improvement for the transmission characteristic.

Figure 8A:
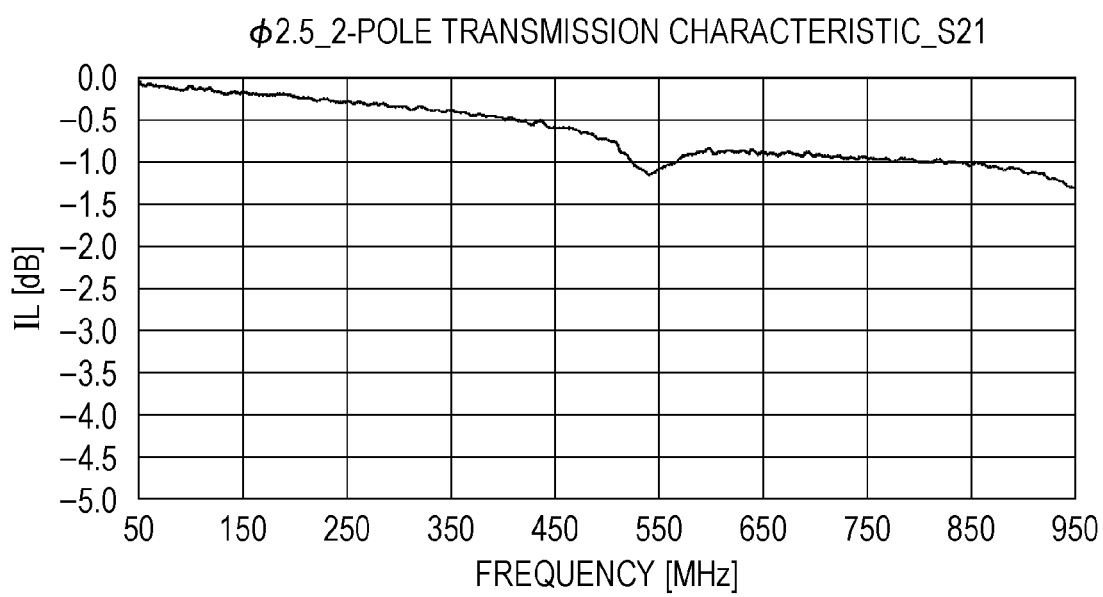
FIGS. 8A and 8B are illustrations showing transmission characteristics when a capacitor is connected to the Rch terminal of the 3-pole jack portion, and when the capacitor is not connected.
Figure 8B:
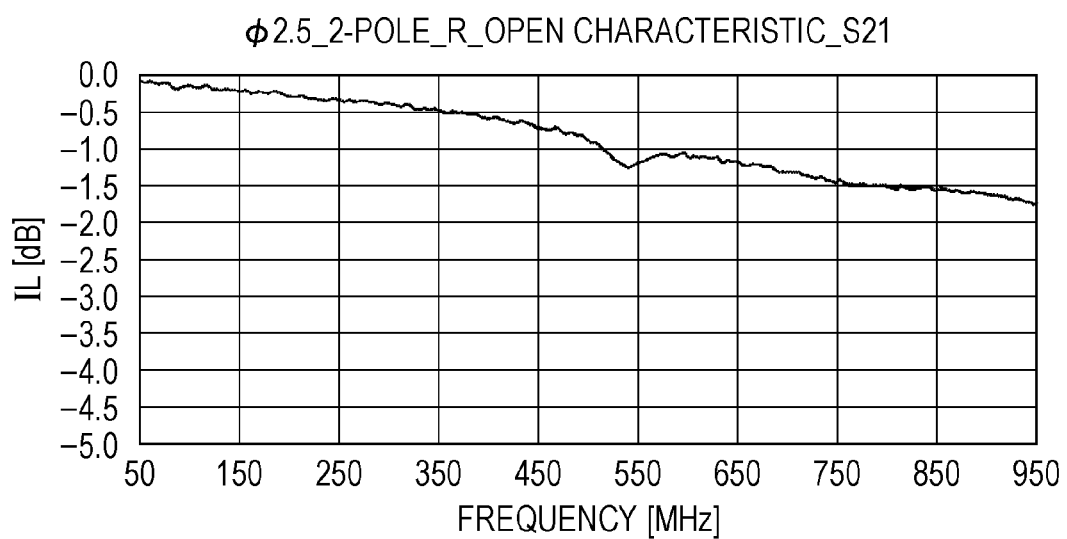

FIGS. 8A and 8B are illustrations showing transmission characteristics when a capacitor is connected to the Rch terminal LR of the 3-pole jack portion 22, and when the capacitor is not connected.

FIG. 8A indicates the transmission characteristic when the capacitor is connected. FIG. 8B indicates the transmission characteristic when the capacitor is not connected.

Figure 9A:
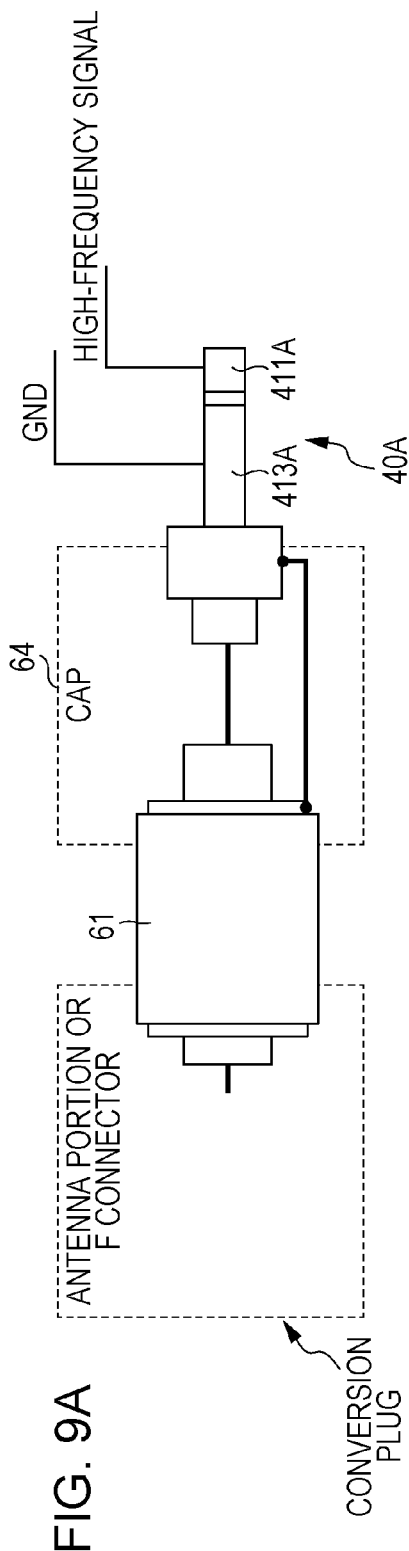
FIGS. 9A and 9B are illustrations for explaining a device that is applied for check of the transmission characteristics in FIGS. 8A and 8B.
Figure 9B:
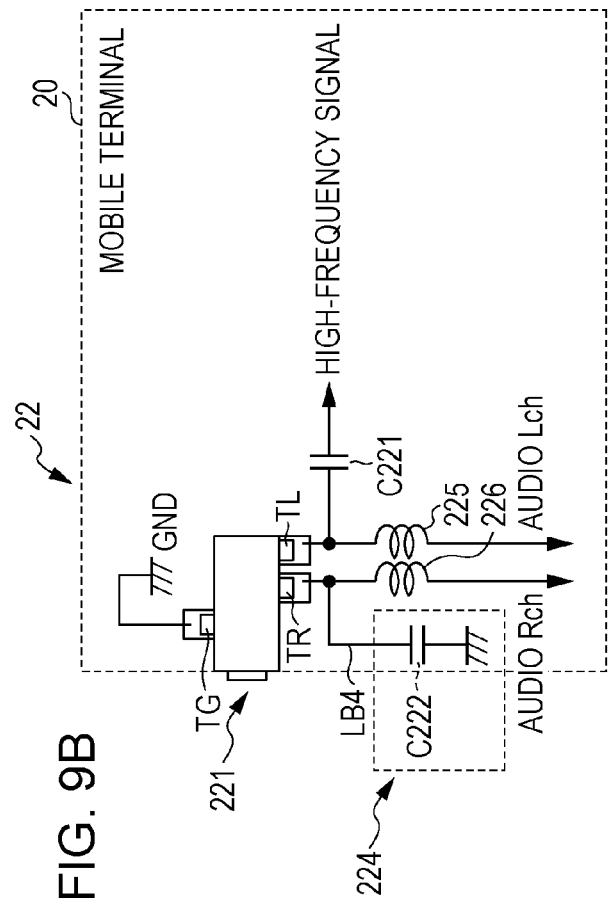

The transmission characteristics are the results of that the transmission characteristics are checked by a network analyzer when the conversion plug shown in FIG. 9A is connected to the 3-pole jack of the connector board shown in FIG. 9B, and when the capacitor C222 is connected (when C is present), and when the capacitor C222 is not connected (when C is not present).

Referring to FIG. 8B, when the capacitor C222 is not connected, the entire transmission characteristic is deteriorated.

In contrast, referring to FIG. 8A, when the capacitor C222 is connected, the entire transmission characteristic is improved.

FIGS. 10A and 10B are illustrations showing peak gain characteristics for frequencies of the receiving device according to the first embodiment in a VHF band and an UHF band when the earphone cable is connected to the antenna cable.

FIG. 10A indicates characteristics in the FM and VHF bands. FIG. 10B indicates characteristics in the UHF band.

In FIGS. 10A and 10B, a curve indicated by H plots a characteristic of horizontal polarization, and a curve indicated by V plots a characteristic of vertical polarization.

FIGS. 10C and 10D show tables indicative of the details of the measurement results in association with the characteristic diagrams.

FIGS. 10A to 10D show the characteristics when the earphone cable 70 of 1200 mm and the antenna cable 60 of 350 mm are provided and when the 3-pole plug and 3-pole jack of φ2.5 mm are used.

Referring to FIGS. 10A to 10D, since the antenna device including the antenna cable and the earphone cable according to this embodiment are used, signals of high and low bands in the UHF and VHF bands can be received.

2. Second Embodiment

Second Configuration Example of Receiving System (Receiving Device)

Figure 11:
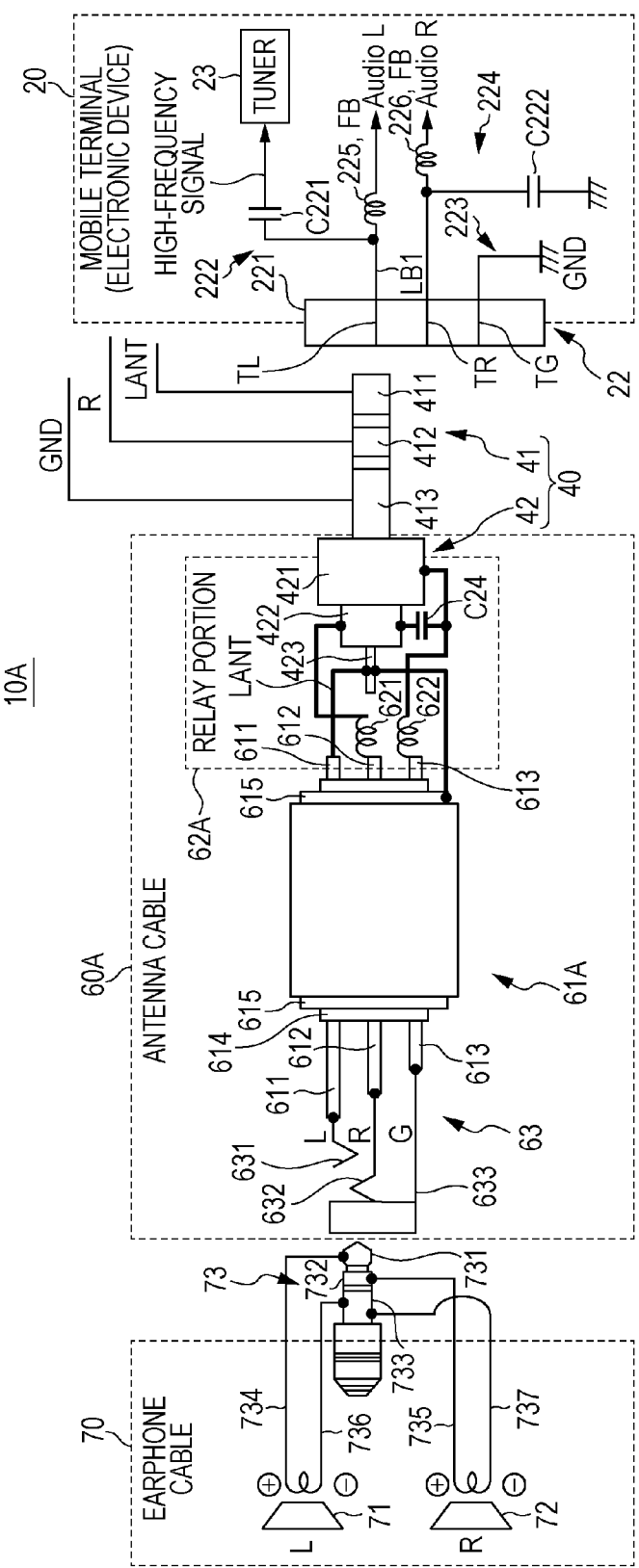
FIG. 11 is an illustration showing an equivalent circuit of a receiving system according to a second embodiment of the present invention.

FIG. 11 is an illustration showing an equivalent circuit of a receiving system according to a second embodiment of the present invention.

A receiving system 10A according to the second embodiment differs from the receiving system 10 according to the first embodiment as follows.

In an antenna device according to the second embodiment, a shield portion 615 of a coaxial cable 61A of an antenna cable 60A is not connected to the GND terminal 421 serving as the second plug terminal, but is connected to the Lch terminal 423 serving as the first plug terminal.

The other configuration is similar to that of the first embodiment.

FIGS. 12A and 12B are illustrations showing peak gain characteristics for frequencies of the receiving device according to the second embodiment in the VHF band and the UHF band when the earphone cable is connected to the antenna cable.

FIG. 12A indicates characteristics in the FM and VHF bands. FIG. 12B indicates characteristics in the UHF band.

In FIGS. 12A and 12B, a curve indicated by H plots a characteristic of horizontal polarization, and a curve indicated by V plots a characteristic of vertical polarization.

FIGS. 12C and 12D show tables indicative of the details of the measurement results in association with the characteristic diagrams.

FIGS. 13A and 13B are illustrations showing peak gain characteristics for frequencies of a receiving device, as a comparative example, in the VHF band and the UHF band when the earphone cable is not connected to the antenna cable.

FIG. 13A indicates characteristics in the FM and VHF bands. FIG. 13B indicates characteristics in the UHF band.

In FIGS. 13A and 13B, a curve indicated by H plots a characteristic of horizontal polarization, and a curve indicated by V plots a characteristic of vertical polarization.

FIGS. 13C and 13D show tables indicative of the details of the measurement results in association with the characteristic diagrams.

Referring to FIGS. 13A to 13D, when the earphone cable is not connected, the characteristics in the VHF band and the UHF band, in particular, the characteristics in the VHF band are markedly deteriorated.

In contrast, referring to FIGS. 12A to 12D, since the antenna device including the antenna cable and the earphone cable according to the second embodiment is used, signals of high and low bands in the UHF and VHF bands can be received.

In the first and second embodiments, the capacitor C41 is arranged between the GND terminal 421 serving as the second plug terminal and the Rch terminal 422 serving as the third plug terminal.

Figure 14:
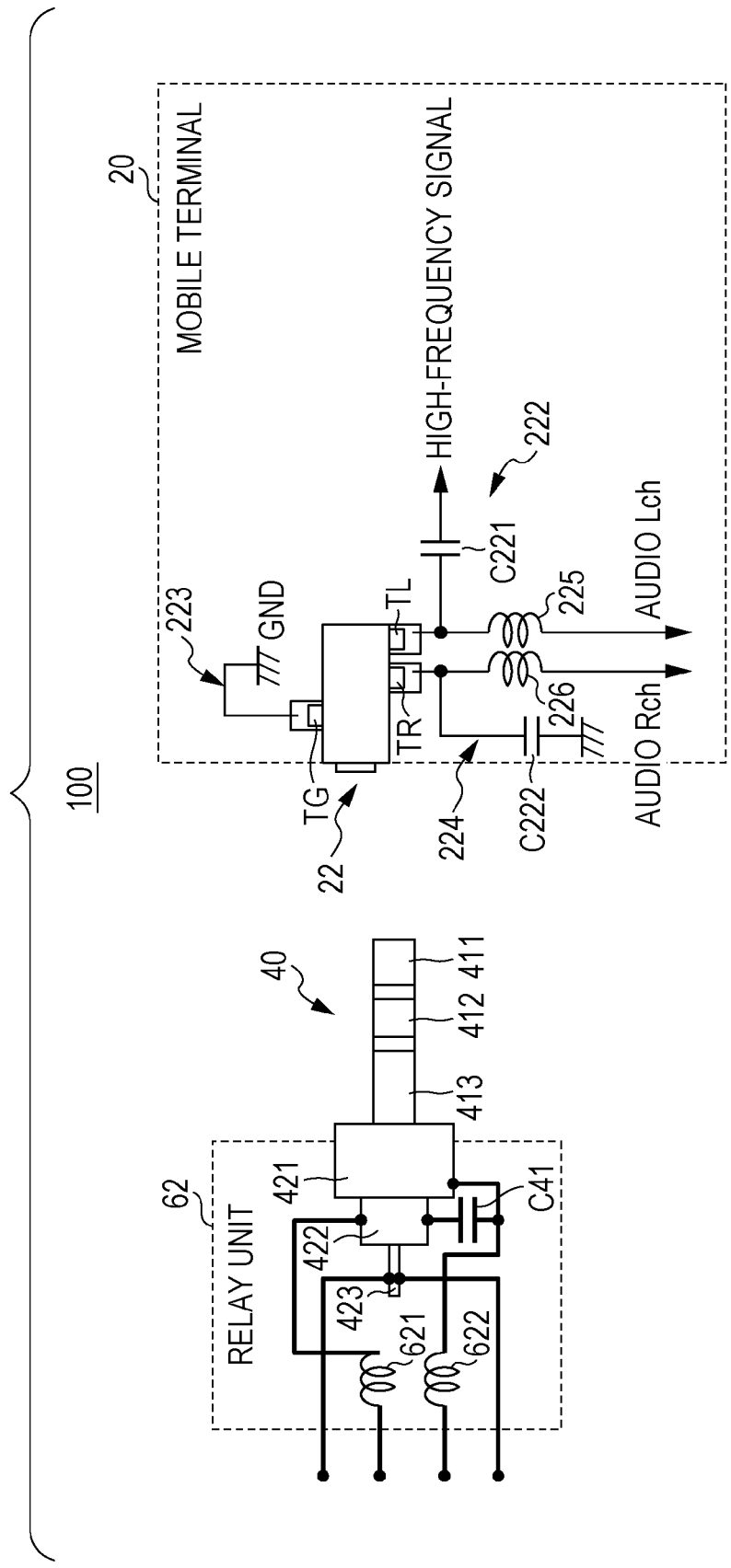
FIG. 14 is an illustration showing a connecting device that is used for an experiment when a capacitor is arranged between a GND terminal serving as a second plug terminal and an Rch terminal serving as a third plug terminal, and for an experiment when the capacitor is not arranged.

FIG. 14 is an illustration showing a connecting device that is used for an experiment when the capacitor C41 is arranged between the GND terminal 421 serving as the second plug terminal and the Rch terminal 422 serving as the third plug terminal, and for an experiment when the capacitor C41 is not arranged.

Figures 15A, 15B, 15C, 15D:
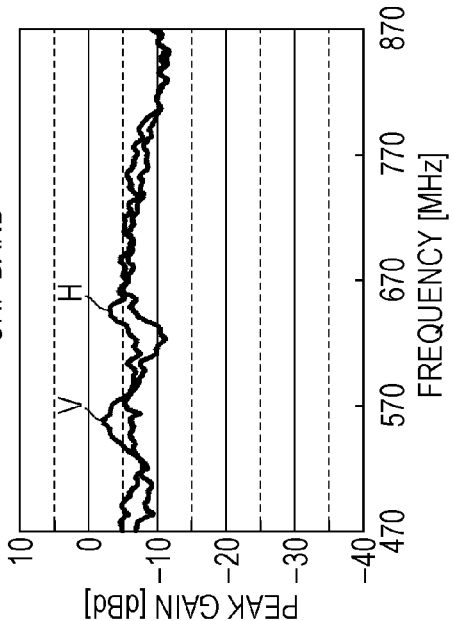
FIGS. 15A to 15D are illustrations showing peak gain characteristics for frequencies of the receiving device according to the second embodiment in the UHF band when the antenna cable is connected to the earphone cable, and when the capacitor is arranged between the GND terminal serving as the second plug terminal and the Rch terminal serving as the third plug terminal, and when the capacitor is not arranged.

FIGS. 15A and 15B showing peak gain characteristics for frequencies of the receiving device according to the second embodiment in the UHF band when the antenna cable is connected to the earphone cable and when the capacitor C41 is arranged between the GND terminal and the Rch terminal, and when the capacitor is not arranged.

FIG. 15A indicates characteristics in the UHF band when the capacitor is not arranged. FIG. 15B indicates characteristic in the UHF band when the capacitor is arranged.

In FIGS. 15A and 15B, a curve indicated by H plots a characteristic of horizontal polarization, and a curve indicated by V plots a characteristic of vertical polarization.

FIGS. 15C and 15D show tables indicative of the details of the measurement results in association with the characteristic diagrams.

When the capacitor C41 is not arranged, even if the capacitors C221 and C222 are arranged at the first lead portion 222 and the third lead portion 224 in the jack portion 22, the characteristics are markedly deteriorated.

In contrast, when the capacitor C41 is arranged between the GND terminal 421 serving as the second plug terminal and the Rch terminal 422 serving as the third plug terminal, good characteristics can be obtained.

With the second embodiment, since the antenna device including the antenna cable and the earphone cable according to this embodiment is used, signals of high and low bands in the UHF band can be received.

3. Third Embodiment

Third Configuration Example of Receiving System (Receiving Device)

Figure 16:
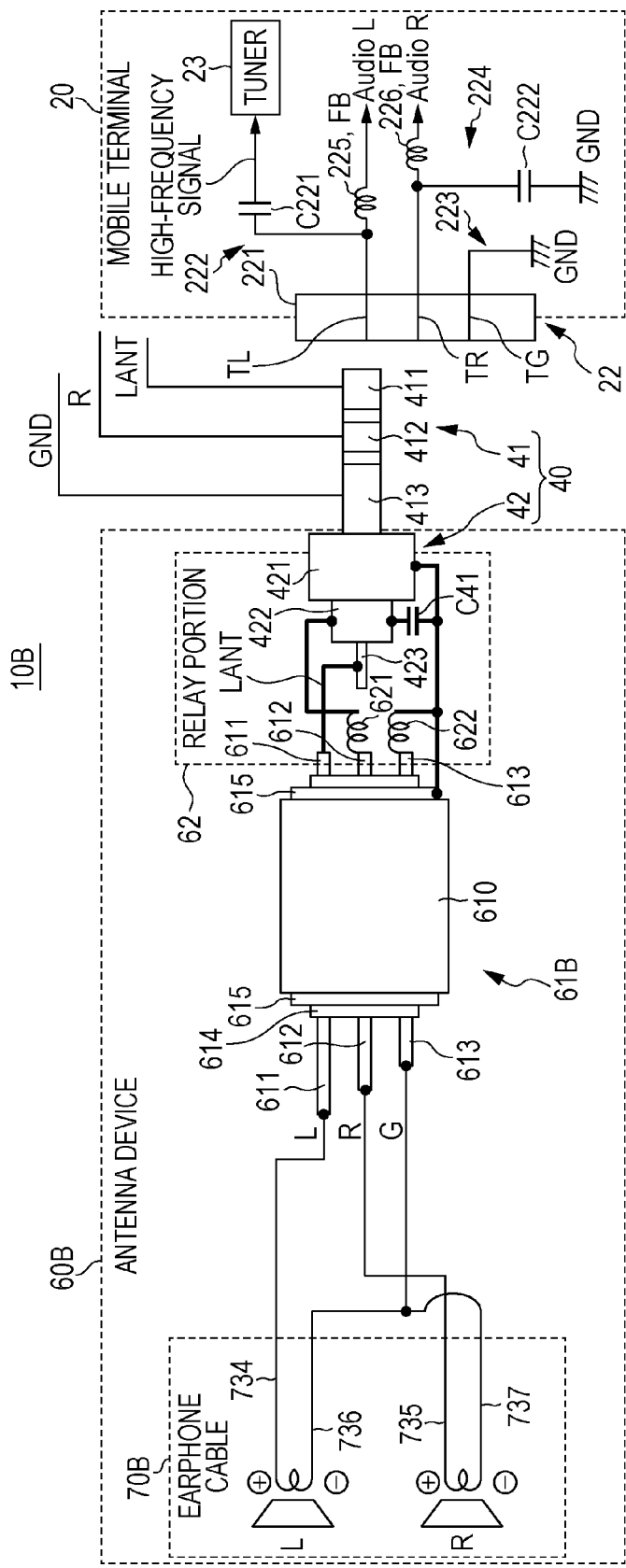
FIG. 16 is an illustration showing an equivalent circuit of a receiving system according to a third embodiment of the present invention.

FIG. 16 is an illustration showing an equivalent circuit of a receiving system according to a third embodiment of the present invention.

A receiving system 10B according to the third embodiment differs from the receiving system 10 according to the first embodiment in that, in an antenna device 30B, an antenna cable 60B is connected to an earphone cable 70B not by plug connection, but these cables are integrally formed.

The other configuration is similar to that of the first embodiment.

With the third embodiment, advantages similar to those of the first embodiment can be attained.

4. Fourth Embodiment

Fourth Configuration Example of Receiving System (Receiving Device)

Figure 17:
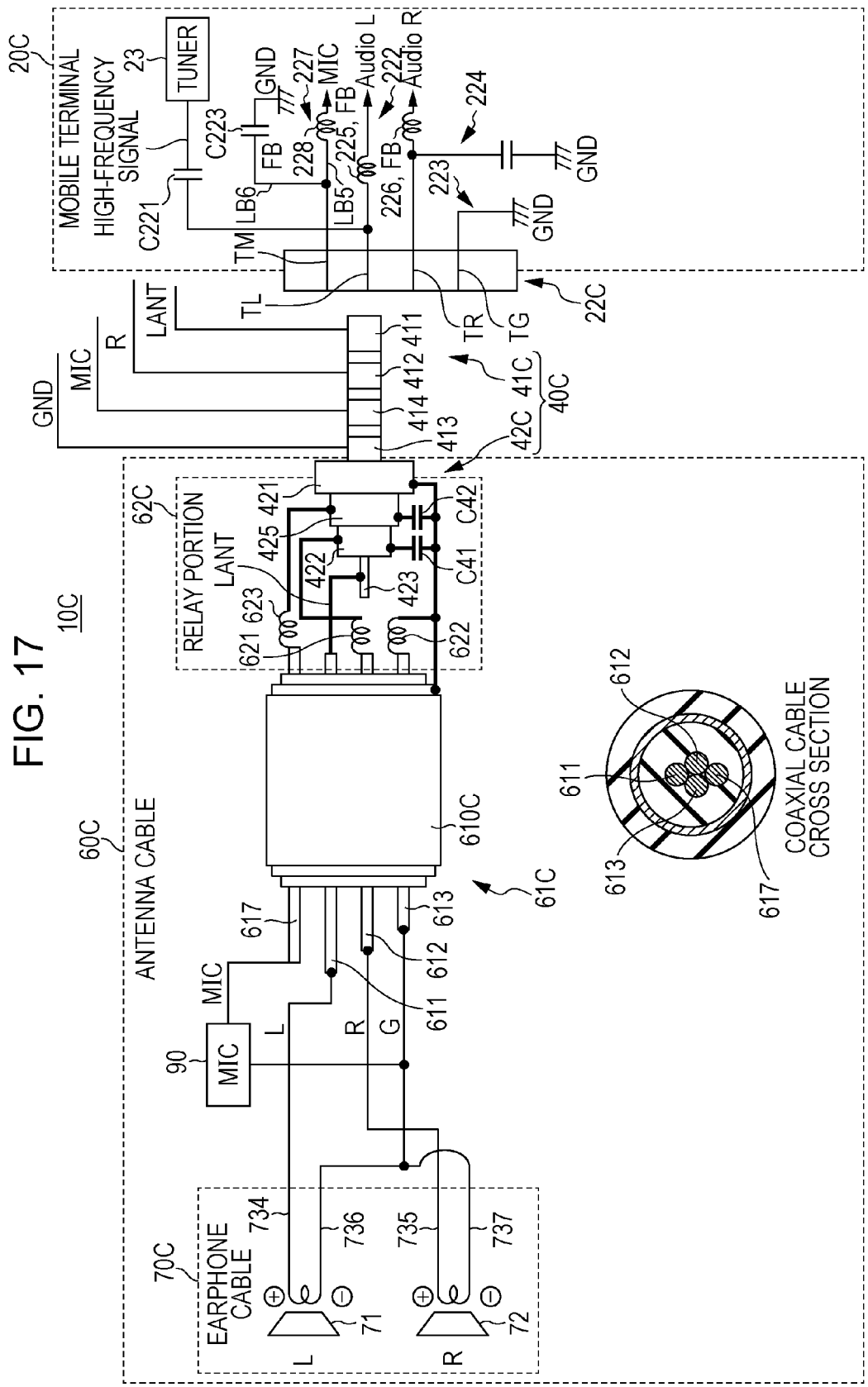
FIG. 17 is an illustration showing an equivalent circuit of a coaxial cable of a receiving system according to a fourth embodiment of the present invention.

FIG. 17 is an illustration showing an equivalent circuit of a receiving system according to a fourth embodiment of the present invention.

A receiving system 10C according to the fourth embodiment differs from the receiving system 10B according to the third embodiment in that a 4-pole plug 40C is used as a plug.

Accordingly, an antenna cable 60C uses a 4-core coaxial cable 610C.

FIG. 17 also illustrates a cross-sectional view of the coaxial cable 610C.

The 4-pole plug 40C includes a microphone (MIC) terminal 414 between the Rch terminal 412 and the GND terminal 413 at a tip end portion 41C.

The 4-pole plug 40C includes an MIC terminal 425 between the GND terminal 421 and the Rch terminal 422 at a rear end portion 42C.

In a relay portion 62C, a high-frequency cutoff portion 623 is connected to the MIC terminal 425. The high-frequency cutoff portion 623 is formed of an inductor L3 or a ferrite bead.

Also, the coaxial cable 610C includes an additional core wire 617 as compared with the 3-core coaxial cable 610.

One end portion of the core wire 617 is connected to the high-frequency cutoff portion 623 in the relay portion 62C.

Also, the other end portion of the core wire 617 is connected to a microphone (MIC) 90. The MIC 90 is connected to the core wire 613 serving as a GND line and to a GND line of an earphone cable 70C.

In the relay portion 62C, a capacitor C42 is formed between the GND terminal 421 serving as the second plug terminal and the third plug terminal (MIC terminal, or fourth plug terminal) 425.

Figure 18:
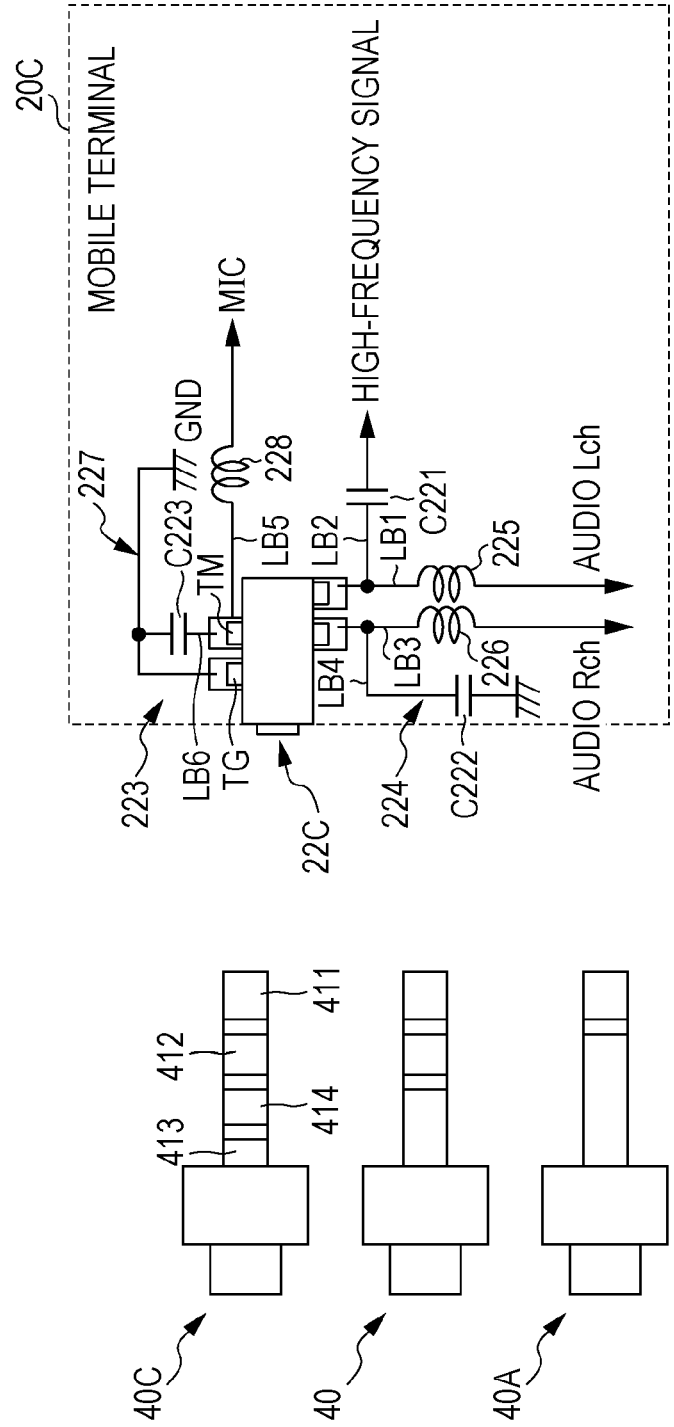
FIG. 18 is an illustration showing an equivalent circuit of a connecting device for a mobile terminal (electronic device) including a 4-pole jack portion according to the fourth embodiment.

FIG. 18 is an illustration showing an equivalent circuit of a connecting device for a mobile terminal (electronic device) including a 4-pole jack portion 22C according to the fourth embodiment.

FIG. 18 also illustrates the 4-pole plug 40C, the 3-pole plug 40, and the 2-pole plug 40A that can be connected to the jack portion 22C.

Also, the jack portion 22C in a mobile terminal (electronic device) 20C additionally includes an MIC terminal TM at a jack 221C, and a lead portion 227 is connected to the MIC terminal TM.

A high-frequency cutoff portion 228 is inserted (connected) to the third lead portion (fourth lead portion) 227. The high-frequency cutoff portion 228 is formed of an inductor L or a ferrite bead FB.

The third lead portion 227 connected to the MIC terminal TM serving as the third jack terminal is split into two lines including a first split line LB5 and a second split line LB6. The high-frequency cutoff portion 228 is inserted (connected) to the first split line LB5. The high-frequency cutoff portion 228 is formed of an inductor L or a ferrite bead FB.

The third lead portion 227 supplies an MIC signal to a signal processing system (not shown) through the high-frequency cutoff portion 228 of the first split line LB5.

The second split line LB6 of the third lead portion 227 is connected to the ground for high-frequency, and has (is connected to) a capacitor C223 for separation for low-frequency.

It is to be noted that the 4-pole jack portion 22C having this configuration can be applied to the 3-pole plug 40 or the 2-pole plug 40A.

The other configuration is similar to that of the third embodiment.

With the fourth embodiment, advantages similar to those of the first to third embodiments can be attained.

5. Fifth Embodiment

Fifth Configuration Example of Receiving System (Receiving Device)

Figure 19:
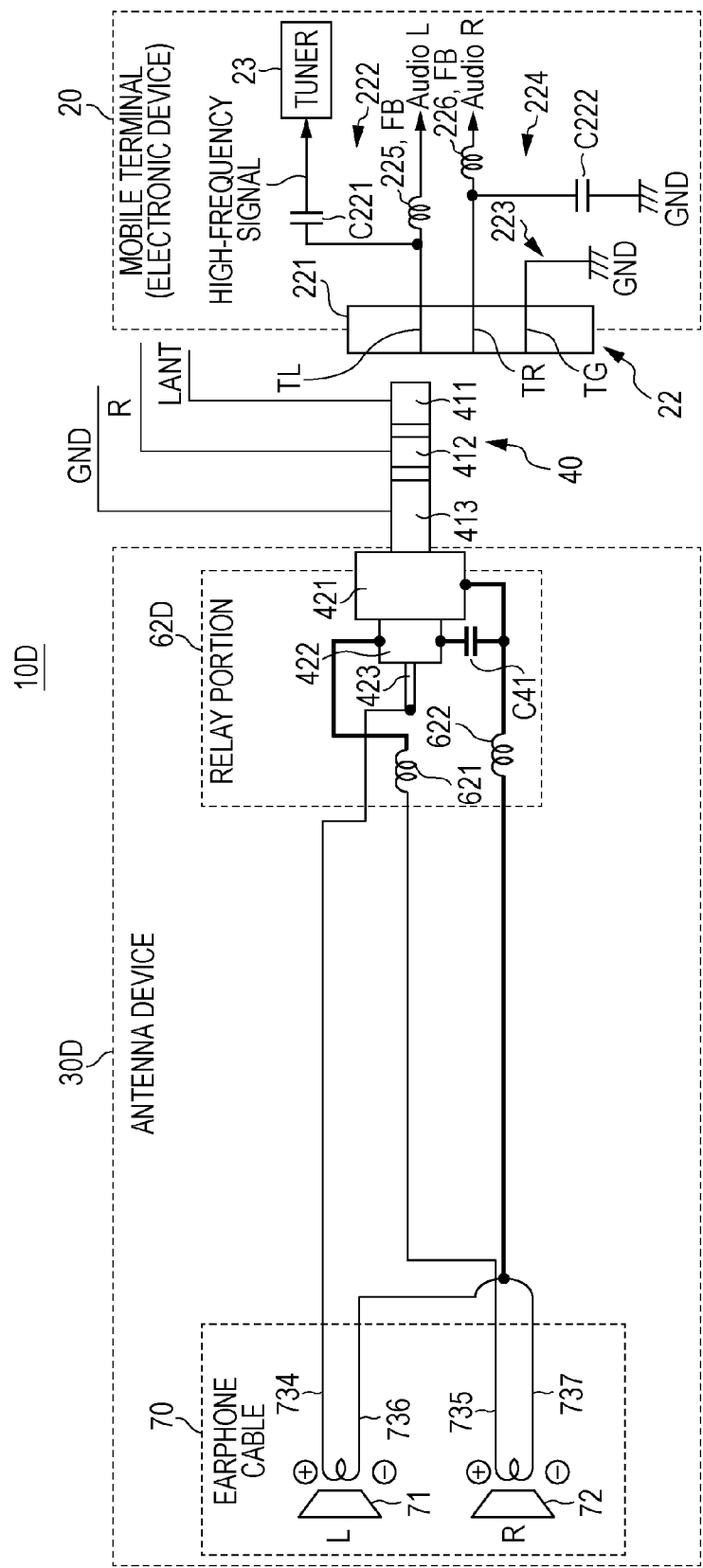
FIG. 19 is an illustration showing an equivalent circuit of a receiving system according to a fifth embodiment of the present invention.

FIG. 19 is an illustration showing an equivalent circuit of a receiving system according to a fifth embodiment of the present invention.

A receiving system 10D according to the fifth embodiment differs from the receiving system 10B according to the third embodiment in that the earphone cable 70 is connected to the 3-pole plug 40 through a relay portion 62D without using the antenna cable.

The other configuration is similar to that of the third embodiment.

With the fifth embodiment, advantages similar to those of the first to third embodiments can be attained.

6. Sixth Embodiment

Sixth Configuration Example of Receiving System (Receiving Device)

Figure 20:
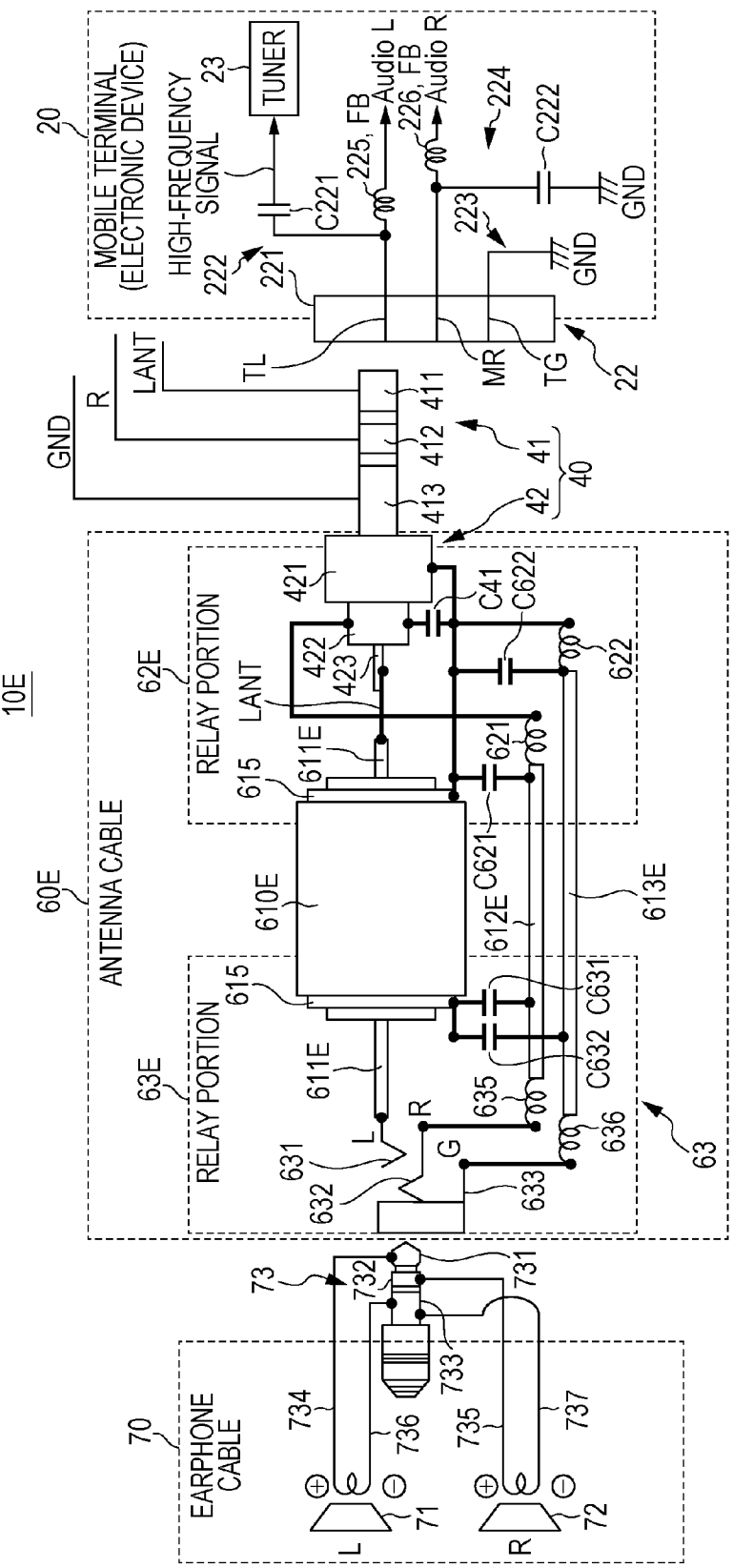
FIG. 20 is an illustration showing an equivalent circuit of a receiving system according to a sixth embodiment of the present invention.

FIG. 20 is an illustration showing an equivalent circuit of a receiving system according to a sixth embodiment of the present invention.

A receiving system 10E according to the sixth embodiment differs from the receiving system 10 according to the first embodiment as follows.

An Lch line 611E serving as a first line is formed of a coaxial cable 610E. A GND line 613E serving as a second line and an Rch line 612E for an audio signal serving as a third line are arranged outside the coaxial cable 610E in parallel to the coaxial cable 610E.

Connection at a relay portion 62E is configured similarly to the configuration of the first embodiment. The Rch line 612E is connected to the Rch terminal 422 through the high-frequency cutoff portion 621, and the GND line 613E is connected to the GND terminal 421 through the high-frequency cutoff portion 622.

The Lch line 611E is directly connected to the Lch terminal 423.

In the relay portion 62E, a capacitor C621 is formed between the shield portion 615 and the Rch line 612E, and a capacitor C622 is formed between the shield portion 615 and the GND line 613E.

In this embodiment, the capacitors are arranged. Accordingly, the antenna characteristic can be improved.

In addition, a relay portion 63E formed of a substrate or formed by molding is arranged at the other end side of an antenna cable 60E.

A 3-pole jack is arranged in the relay portion 63E. In the relay portion 63E, the other end of the Lch line 611E of the coaxial cable 610E is connected to an Lch terminal 631.

High-frequency cutoff portions 635 and 636 are respectively connected to the other ends of the Rch line 612E and the GND line 613E. The high-frequency cutoff portions 635 and 636 are formed of inductors or ferrite beads and have high-frequency cutoff functions. The high-frequency cutoff portion 635 is connected to the Rch terminal 632, and the high-frequency cutoff portion 636 is connected to the GND terminal 633.

In the relay portion 63E, a capacitor C631 is formed between the shield portion 615 and the Rch line 612E, and a capacitor C632 is formed between the shield portion 615 and the GND line 613E.

With the sixth embodiment having this configuration, advantages similar to those described above can be attained.

It is to be noted that this configuration can be applied to the 4-pole arrangement.

7. Seventh Embodiment

Seventh Configuration Example of Receiving System (Receiving Device)

Figure 21:
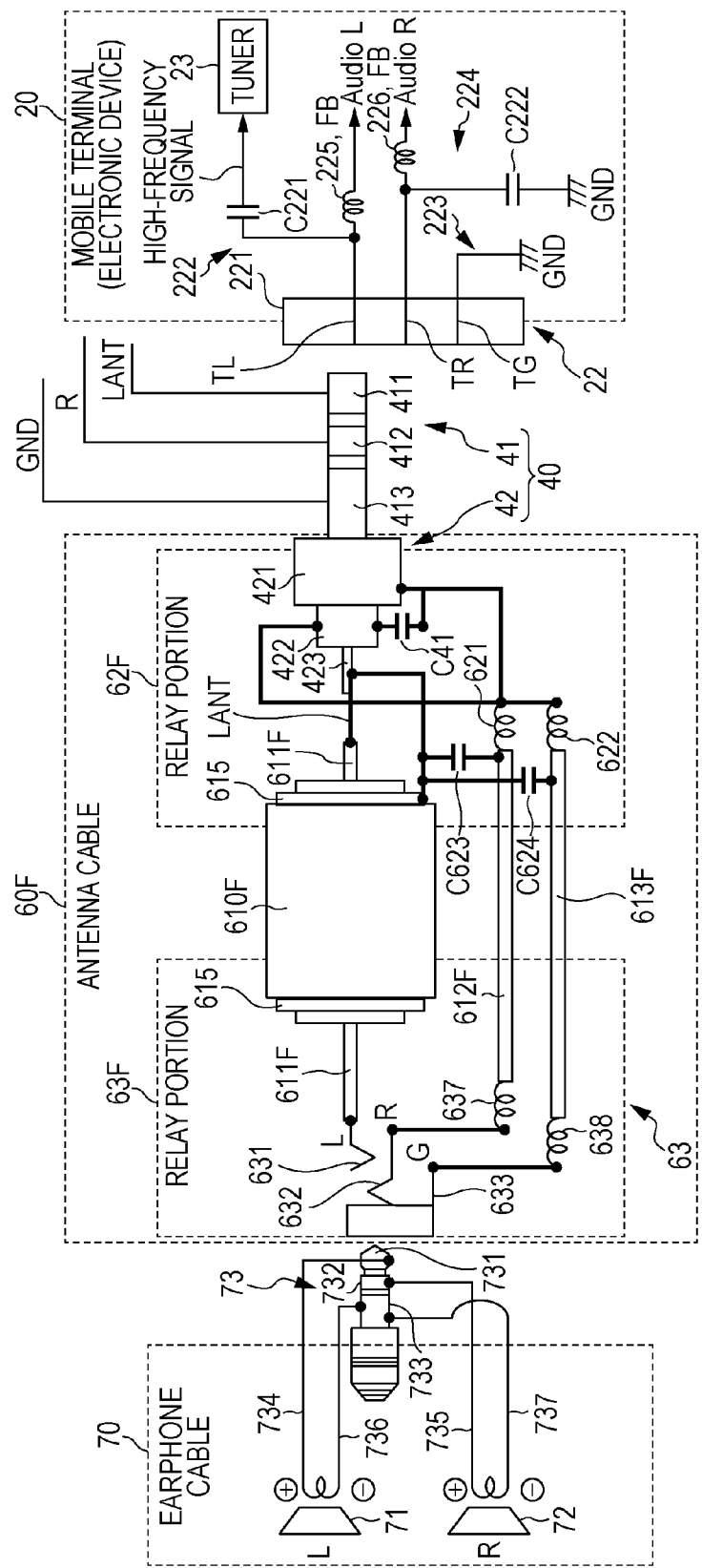
FIG. 21 is an illustration showing an equivalent circuit of a receiving system according to a seventh embodiment of the present invention.

FIG. 21 is an illustration showing an equivalent circuit of a receiving system according to a seventh embodiment of the present invention.

A receiving system 10F according to the seventh embodiment differs from the receiving system 10A according to the second embodiment as follows.

An Lch line 611F serving as a first line is formed of a coaxial cable 610F. A GND line 613F serving as a second line and an Rch line 612F for an audio signal serving as a third line are arranged outside the coaxial cable 610F in parallel to the coaxial cable 610F.

Connection at a relay portion 62F is configured similarly to the configuration of the first embodiment. The Rch line 612F is connected to the Rch terminal 422 through the high-frequency cutoff portion 621, and the GND line 613F is connected to the GND terminal 421 through the high-frequency cutoff portion 622.

The Lch line 611F is directly connected to the Lch terminal 423.

In the relay portion 62F, a capacitor C623 is formed between the shield portion 615 and the Rch line 612F, and a capacitor C624 is formed between the shield portion 615 and the GND line 613F.

In this embodiment, the capacitors are arranged. Accordingly, the antenna characteristic can be improved.

In addition, a relay portion 63F formed of a substrate or formed by molding is arranged at the other end side of an antenna cable 60F.

A 3-pole jack is arranged in the relay portion 63F. In the relay portion 63F, the other end of the Lch line 611F of the coaxial cable 610F is connected to an Lch terminal 631.

High-frequency cutoff portions 637 and 638 are respectively connected to the other ends of the Rch line 612F and the GND line 613F. The high-frequency cutoff portions 637 and 638 are formed of inductors or ferrite beads and have high-frequency cutoff functions. The high-frequency cutoff portion 637 is connected to the Rch terminal 632, and the high-frequency cutoff portion 638 is connected to the GND terminal 633.

With the seventh embodiment having this configuration, advantages similar to those described above can be attained.

It is to be noted that this configuration can be applied to the 4-pole arrangement.

As described above, with these embodiments, the antenna that receives signals in the VHF band and the UHF band by using the plug jack of ϕ3.5 mm or ϕ2.5 mm that is frequently used for typical audio signals can reduce the loss at the coupling portion and provide high receiving performance.

In the antenna cable, a portion of the transmission cable connected to the relay portion does not have to have the coaxial structure, and may include parallel two lines.

With these embodiments, since a connector can serve as connectors for high-frequency and low-frequency, the number and size of connectors can be reduced. In addition, the connector can serve as connectors for an earphone antenna or other antennas of typical audio signals.

Also, the high-frequency cutoff portion may be formed by winding a cable portion around a magnetic material.

The present application contains subject matter related to that disclosed in Japanese Priority Patent Application JP 2010-073615 filed in the Japan Patent Office on Mar. 26, 2010, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A connecting device, comprising:
    an audio signal plug to which an audio signal transmission cable including at least three lines can be connected, the audio signal plug including at least three plug terminals,
    wherein the three plug terminals of the audio signal plug include first, second, and third plug terminals,
    wherein the first plug terminal functions as a signal line in which a high-frequency signal is superimposed on an audio signal,
    wherein the second plug terminal different from the first plug terminal functions as a ground for low-frequency and high-frequency, and
    wherein the third plug terminal different from the first and second plug terminals functions as a ground by capacitive coupling for the high-frequency, and has a function for transmitting a signal different from a signal of the first plug terminal for the low-frequency.

2. The connecting device according to claim 1,
    wherein a capacitor is formed between the second and third plug terminals.

3. The connecting device according to claim 2,
    wherein high-frequency cutoff portions having high-frequency cutoff functions are respectively connected to connecting portions of the second and third plug terminals with respect to an audio signal transmission cable.

4. The connecting device according to claim 3,
    wherein the capacitor is formed between the third plug terminal and the connecting portion of the second plug terminal and the high-frequency cutoff portion.

5. The connecting device according to claim 4,
    wherein the capacitor includes an insulating portion between the second plug terminal and the third plug terminal.

6. The connecting device according to claim 1, further comprising:
    a jack portion to which the audio signal plug can be connected, the jack portion including at least three jack terminals that are connected to the plurality of plug terminals of the audio signal plug when the audio signal plug is connected to the jack portion; and
    a plurality of lead portions connected to the plurality of jack terminals,
    wherein the plurality of jack terminals include a first jack terminal, and the plurality of lead portions include a first lead portion to which the first plug terminal is connected,
    wherein the first lead portion is split into split portions including first and second split portions, a high-frequency cutoff portion having a high-frequency cutoff function being connected to the first split portion, and
    wherein a capacitor for acquiring a high-frequency signal is connected to the second split portion.

7. The connecting device according to claim 6,
    wherein the plurality of lead portions include a second lead portion that is different from the first lead portion and is connected to the second jack terminal, the second lead portion being directly connected to a ground.

8. The connecting device according to claim 7,
    wherein the plurality of jack terminals include at least three jack terminals having a third jack terminal, and the plurality of lead portions include at least three lead portions having a third lead portion, and
    wherein the third lead portion is different from the first and second lead portions and is connected to the third jack terminal,
        wherein the first lead portion is split into split portions including first and second split portions, a high-frequency cutoff portion having a high-frequency cutoff function being connected to the first split portion, and
        wherein the second split portion is connected to a ground for the high-frequency, and has a capacitor for separation for the low-frequency.

9. An antenna device, comprising:
    a connecting device including an audio signal plug having at least three plug terminals including first, second, and third plug terminals; and an audio signal transmission cable including at least three lines including a first line, the audio signal transmission cable transmitting an audio signal when the audio signal plug is connected to one end side of the audio signal transmission cable, wherein the first plug terminal of the audio signal plug and the first line of the audio signal transmission cable are connected to each other, and hence an antenna signal line in which a high-frequency signal is superimposed on an audio signal is formed at the first plug terminal, wherein the second plug terminal different from the first plug terminal functions as a ground for high-frequency and low-frequency, and wherein the third plug terminal different from the first and second plug terminals functions as a ground by capacitive coupling for the high-frequency, and has a function for transmitting a signal different from a signal of the first plug terminal for the low-frequency.

10. The antenna device according to claim 9, wherein a capacitor is formed between the second and third plug terminals.

11. The antenna device according to claim 10, wherein high-frequency cutoff portions having high-frequency cutoff functions are respectively connected to connecting portions of the second and third plug terminals with respect to the audio signal transmission cable.

12. The antenna device according to claim 11, wherein the capacitor is formed between the third plug terminal and the connecting portion of the second plug terminal and the high-frequency cutoff portion.

13. The antenna device according to claim 9,
wherein the connecting device includes
a jack portion to which the audio signal plug can be connected, the jack portion including at least three jack terminals that are connected to the plurality of plug terminals of the audio signal plug when the audio signal plug is connected to the jack portion, and
a plurality of lead portions connected to the plurality of jack terminals,
wherein the plurality of jack terminals include a first jack terminal, and the plurality of lead portions include a first lead portion to which the first plug terminal is connected,
wherein the first lead portion is split into split portions including first and second split portions, a high-frequency cutoff portion having a high-frequency cutoff function being connected to the first split portion, and
wherein a capacitor for acquiring a high-frequency signal is connected to the second split portion.

14. The antenna device according to claim 13, wherein the plurality of lead portions include a second lead portion that is different from the first lead portion and is connected to the second jack terminal, the second lead portion being directly connected to a ground.

15. The antenna device according to claim 14,
wherein the plurality of jack terminals include at least three jack terminals having a third jack terminal, and the plurality of lead portions include at least three lead portions having a third lead portion, and
wherein the third lead portion is different from the first and second lead portions and is connected to the third jack terminal,
wherein the first lead portion is split into split portions including first and second split portions, a high-frequency cutoff portion having a high-frequency cutoff function being connected to the first split portion, and
wherein the second split portion is connected to a ground for the high-frequency, and has a capacitor for separation for the low-frequency.

16. The antenna device according claim 9,
wherein the audio signal transmission cable includes
a coaxial cable having a shield portion, serving as an antenna cable, and being covered with a jacket,
wherein the shield portion of the coaxial cable is directly connected to the second plug terminal at one end side of the coaxial cable.

17. The antenna device according to claim 9,
wherein the audio signal transmission cable includes
a coaxial cable having a shield portion, serving as an antenna cable, and being covered with a jacket,
wherein the shield portion of the coaxial cable is directly connected to the first plug terminal at one end side of the coaxial cable.

18. The antenna device according to claim 17,
wherein the audio signal transmission cable includes
the coaxial cable with the shield portion including the first line that forms the antenna signal line and being covered with the jacket, and
second and third lines different from the first line that forms the antenna signal line, the second and third lines being arranged in parallel to the coaxial cable, and
wherein a capacitor is formed between the antenna signal line to which the shield portion is connected, and an end portion of at least one of the second and third lines, at least one of end portions of the coaxial cable.

19. The antenna device according to claim 17 or 18,
wherein the audio signal transmission cable includes
an earphone cable, and
at least an earphone cable signal line as the third line, from among the earphone cable signal line and a microphone signal line, and
wherein a high-frequency cutoff portion having a high-frequency cutoff function is connected at least between another end portion of the earphone cable signal line and a signal line of the earphone cable.

20. A receiving device, comprising:
an antenna device; and
an electronic device to which the antenna device can be connected, the electronic device having a receiving function for a broadcast wave,
wherein the antenna device includes
a connecting device including an audio signal plug having at least three plug terminals including first, second, and third plug terminals, and
an audio signal transmission cable including at least three lines including a first line, the audio signal transmission cable transmitting an audio signal when the audio signal plug is connected to one end side of the audio signal transmission cable,
wherein the first plug terminal of the audio signal plug and the first line of the audio signal transmission cable are connected to each other, and hence an antenna signal line in which a high-frequency signal is superimposed on an audio signal is formed at the first plug terminal,
wherein the second plug terminal different from the first plug terminal functions as a ground for high-frequency and low-frequency, and
wherein the third plug terminal different from the first and second plug terminals functions as a ground by capacitive coupling for the high-frequency, and has a function for transmitting a signal different from a signal of the first plug terminal for the low-frequency.

* * * * *